(12) United States Patent
Yawata et al.

(10) Patent No.: US 9,293,787 B2
(45) Date of Patent: Mar. 22, 2016

(54) NONAQUEOUS ELECTROLYTE FOR SECONDARY BATTERY AND LITHIUM SECONDARY BATTERY

(71) Applicant: FUJIFILM Corporation, Minato-ku, Tokyo (JP)

(72) Inventors: Toshihiko Yawata, Ashigarakami-gun (JP); Michio Ono, Ashigarakami-gun (JP); Yoshinori Kanazawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 257 days.

(21) Appl. No.: 13/834,063

(22) Filed: Mar. 15, 2013

(65) Prior Publication Data
US 2013/0202955 A1 Aug. 8, 2013

Related U.S. Application Data

(63) Continuation of application No. PCT/JP2011/069829, filed on Aug. 31, 2011.

(30) Foreign Application Priority Data

Sep. 22, 2010 (JP) .................................. 2010-212520
Apr. 8, 2011 (JP) .................................. 2011-086245

(51) Int. Cl.
*H01M 10/0566* (2010.01)
*H01M 10/052* (2010.01)
(Continued)

(52) U.S. Cl.
CPC ........ *H01M 10/0566* (2013.01); *H01M 10/052* (2013.01); *H01M 10/0568* (2013.01); *H01M 10/0569* (2013.01); *Y02E 60/122* (2013.01)

(58) Field of Classification Search
CPC ................................................. H01M 10/0566
USPC .................................. 429/302, 324, 332, 330
See application file for complete search history.

(56) References Cited

U.S. PATENT DOCUMENTS

2003/0198870 A1* 10/2003 Wariishi et al. ............... 429/313
2005/0170254 A1* 8/2005 West et al. ..................... 429/313

(Continued)

FOREIGN PATENT DOCUMENTS

CN 101003630 A 7/2007
JP 6-223874 A 8/1994
(Continued)

OTHER PUBLICATIONS

JP 2008004349 (MT).*
(Continued)

*Primary Examiner* — Patrick Ryan
*Assistant Examiner* — Alex Usyatinsky
(74) *Attorney, Agent, or Firm* — Sughrue Mion, PLLC

(57) ABSTRACT

Provided are a non-aqueous electrolyte liquid for a secondary battery, which has excellent lithium ion conductibility and voltage resistance and is suitably used in a lithium secondary battery, and a high output power lithium secondary battery containing this non-aqueous electrolyte liquid for a secondary battery. Disclosed is a non-aqueous electrolyte liquid for a secondary battery containing a metal salt containing an ion of a metal which belongs to Group 1 or Group 2 of the Periodic Table of Elements, and at least one selected from the group consisting of silicon compounds represented by the following formula (1) or formula (2).

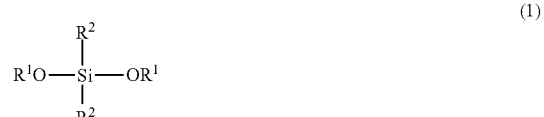

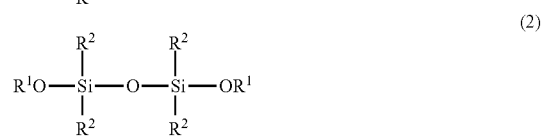

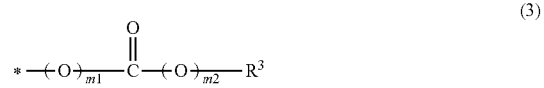

12 Claims, 1 Drawing Sheet

(51) Int. Cl.
  *H01M 10/0568* (2010.01)
  *H01M 10/0569* (2010.01)

(56) References Cited

U.S. PATENT DOCUMENTS

| | | | |
|---|---|---|---|
| 2007/0048620 A1 | 3/2007 | Nakanishi et al. | |
| 2007/0059597 A1* | 3/2007 | Nakanishi et al. | 429/188 |
| 2007/0059607 A1* | 3/2007 | Nakanishi et al. | 429/330 |
| 2007/0243470 A1* | 10/2007 | Yamamoto et al. | 429/326 |
| 2009/0325065 A1* | 12/2009 | Fujii et al. | 429/199 |
| 2010/0119956 A1* | 5/2010 | Tokuda et al. | 429/338 |
| 2010/0330433 A1* | 12/2010 | Amine et al. | 429/302 |
| 2011/0123871 A1* | 5/2011 | Nakagawa et al. | 429/326 |

FOREIGN PATENT DOCUMENTS

| | | | |
|---|---|---|---|
| JP | 8-88023 A | | 4/1996 |
| JP | 8-162154 A | | 6/1996 |
| JP | 8-190932 A | | 7/1996 |
| JP | 9-171839 A | | 6/1997 |
| JP | 10-144346 A | | 5/1998 |
| JP | 2006-24440 A | | 1/2006 |
| JP | 2007-77052 A | | 3/2007 |
| JP | 2007-77075 A | | 3/2007 |
| JP | 2007-87935 A | | 4/2007 |
| JP | 2008004349 | * | 1/2008 |
| JP | 2009004352 | * | 1/2009 |

OTHER PUBLICATIONS

International Search Report for PCT/JP2011/069829 dated Nov. 15, 2011.
Written Opinion for PCT/JP2011/069829 dated Nov. 15, 2011.
Notice of Reasons for Rejection, dated Oct. 14, 2014, issued in corresponding JP Application No. 2011-086245, 5 pages in English and Japanese.
First Notification of Office Action, dated Dec. 31, 2014, issued in corresponding CN Application No. 201180044735.9, 15 pages in English and Chinese.

* cited by examiner

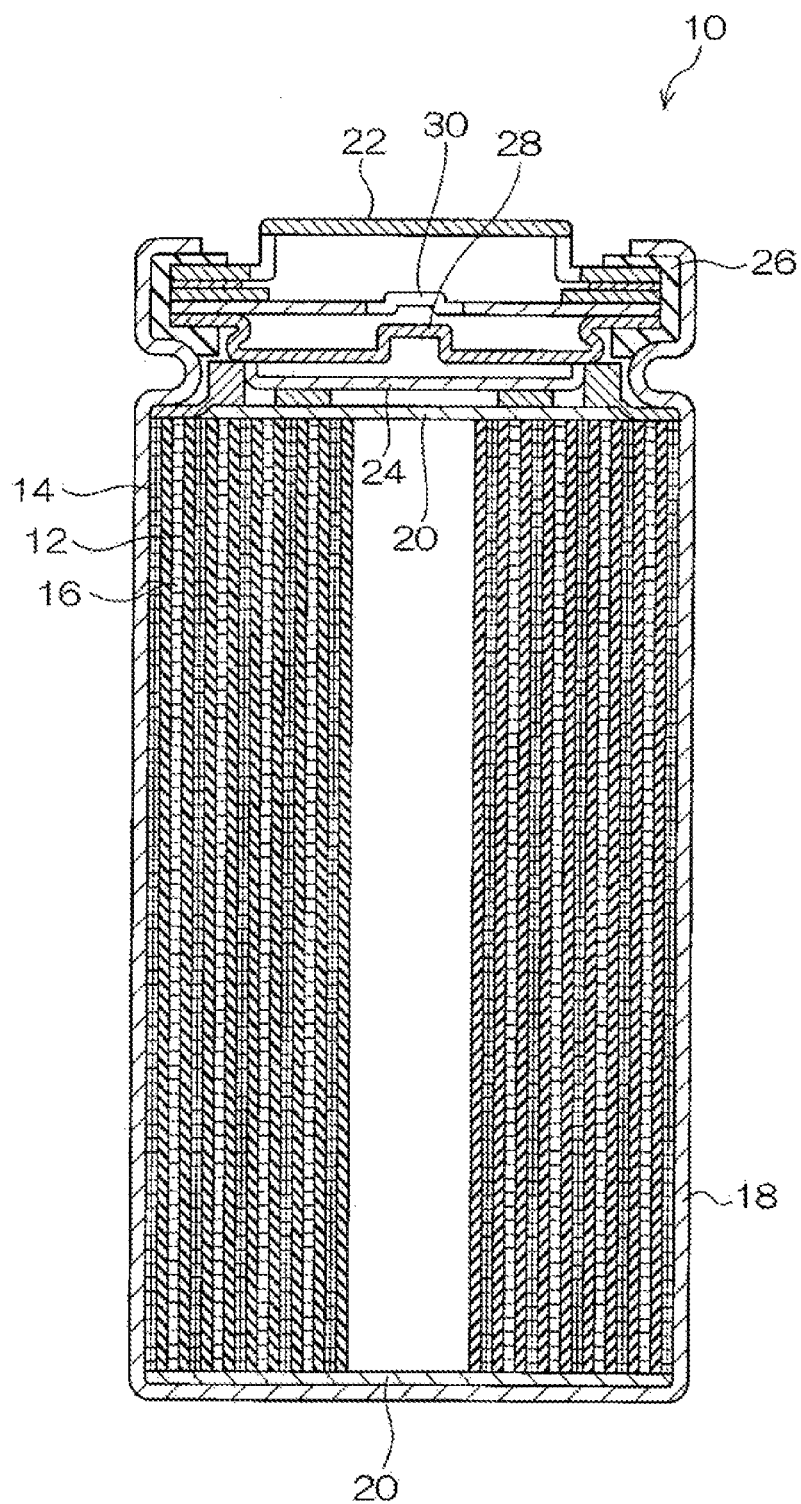

NONAQUEOUS ELECTROLYTE FOR SECONDARY BATTERY AND LITHIUM SECONDARY BATTERY

CROSS-REFERENCE TO RELATED APPLICATIONS

This application is a continuation application of International Application No. PCT/JP2011/069829, filed Aug. 31, 2011, which is incorporated herein by reference. Further, this application claims priority from Japanese Patent Application No. 2010-212520, filed Sep. 22, 2010, and Japanese Patent Application No. 2011-086245, filed Apr. 8, 2011, which are incorporated herein by reference.

BACKGROUND

1. Technical Field

The invention relates to a non-aqueous electrolyte liquid for a secondary battery, and a lithium secondary battery containing the electrolyte liquid. More particularly, the invention relates to a non-aqueous electrolyte liquid for a secondary battery containing a particular silicon compound, which is suitably used in lithium secondary batteries, and a lithium secondary battery using the electrolyte liquid.

2. Background Art

Lithium secondary batteries are used in PCs, video cameras, mobile telephones, and the like. Along with a functional enhancement of these electronic instruments, an increase in the energy density is desired in relation to the batteries that serve as power sources. Furthermore, in recent years, against the background of a global-scale environmental problem of the so-called reduction of carbon dioxide emissions, size increment of lithium secondary batteries has also been under consideration in connection with the applications of automotive power supplies or storage of natural energy, and there is an increasing demand for improvements in cost, performance, and safety. Thus, there is a demand for the development of an electrolyte liquid which enables such improvements.

Regarding the performance of large-sized batteries, particularly an enhancement of energy density (electric capacity per unit mass or unit volume) has been a great task. One of the effective methods for such an enhancement involves increasing of the battery voltage. In order to increase the battery voltage, it is essential to use a positive electrode material having a high lithium insertion/release potential, and an electrolyte liquid having an oxidation resistance to withstand the potential.

In conventional electrolyte liquids, use has been made of solvent mixtures of a cyclic carbonate such as ethylene carbonate (EC) or propylene carbonate (PC) and a chain-like carbonate such as diethyl carbonate (DEC) or dimethyl carbonate (DMC) for decreasing the viscousness of the electrolyte liquid. However, since these solvents do not have sufficient oxidation resistance, when a high voltage positive electrode is used, there is a problem that decomposition of the solvent occurs, and the battery voltage is decreased.

As a means for increasing the voltage resistance of such an electrolyte liquid as described above, two methods have been suggested, such as (1) a method of using a solvent having a molecular structure that is itself not easily oxidizable, as a solvent; and (2) a method of adding a small amount of an additive for suppressing oxidative decomposition of solvent molecules by acting on the surface of the electrode material, to a conventional solvent.

Examples of the solvent having a molecular structure that is not easily oxidizable, which have been suggested as solvents that can be used in non-aqueous electrolyte liquids for secondary batteries, include sulfolane as suggested in JP 6-223874 A; dimethyl malonate as suggested in JP 8-162154 A; diethyl malonate as suggested in JP 8-190932 A; thiocyanic acid esters as suggested in JP 9-171839 A; and halogen-substituted carbonates as suggested in JP 10-144346 A.

However, even if conventionally known solvents that are not easily oxidizable are used, it is difficult to obtain oxidation resistance at a practically sufficient level, and it is the current situation that a solvent which is capable of achieving a balance between ion conductibility and oxidation resistance has not been found yet. Furthermore, using a method of using an additive that suppresses oxidation of solvent molecules can also be taken into consideration; however, there is a defect that the amount of the additive that can be optimally used is limited, and the voltage resistance effect is not sustained because an increase in the amount of addition causes a decrease in the battery performance when such an additive is added in an amount sufficient for oxidation resistance.

In addition, JP 8-88023 A suggests an electrolyte liquid having self-extinguishability and satisfactory charging-discharging performance, which contains a phosphoric acid ester compound as an electrolyte in a hydrocarbon-based solvent, and a battery using the electrolyte liquid. However, this battery still cannot be said to be satisfactory for practical use in terms of flame retardancy, and a further improvement is needed.

SUMMARY OF INVENTION

Technical Problem

It is an object of the invention to provide a non-aqueous electrolyte liquid for a secondary battery, having excellent conductibility for metal ions represented by lithium ion, and excellent voltage resistance, and a high output lithium secondary battery having excellent voltage resistance, which contains the non-aqueous electrolyte liquid for a secondary battery.

Solution of Problem

The inventors of the invention conducted a thorough research in view of the problems described above, and as a result, the inventors found that a silane compound having a particular structure has excellent dissolvability for metal ions represented by a lithium salt, has high ionic conductivity and a high lithium ion transport number, and has excellent voltage resistance, thus completing the invention.

That is, according to a first aspect of the invention, there is provided a non-aqueous electrolyte liquid for a secondary battery, including a metal salt containing an ion of a metal which belongs to Group 1 or Group 2 of the Periodic Table of Elements, and at least one compound selected from the group consisting of silicon compounds represented by the following formula (1) or formula (2):

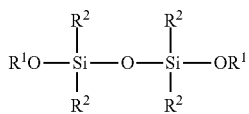

(2)

wherein in formula (1) and formula (2), $R^1$ represents a substituent which contains an alkyl group having 1 to 5 carbon atoms and is bonded to the adjacent oxygen atom; $R^2$ represents an alkyl group having 1 to 5 carbon atoms, or an $OR^1$ group; $R^1$s and $R^2$s may be the same or different from each other, and at least one $R^1$ or $R^2$ represents an alkyl group having 1 to 5 carbon atoms and having a substituent represented by the following formula (3), or an alkoxy group having 1 to 5 carbon atoms and having a substituent represented by the following formula (3); and $R^1$ and $R^2$ may be bonded to each other and form a ring.

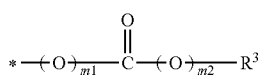

(3)

wherein in formula (3), $R^3$ represents an alkyl group having 1 to 5 carbon atoms; m1 and m2 each independently represent 0 or 1, provided that m1 and m2 are not both zero; * represents the position of bonding to the alkyl group or alkoxy group represented by $R^1$ or $R^2$; and $R^3$ and $R^1$ or $R^2$ to which a substituent represented by formula (3) is linked, may be bonded to each other and form a ring.

According to a second aspect of the invention, there is provided a non-aqueous electrolyte liquid for a secondary battery such as described in the first aspect or the second aspect of the invention, in which the structure of $R^1$ or $R^2$ in formula (1) and formula (2), to which the substituent represented by formula (3) is bonded, is selected from structures represented by the following formula (4) to the following formula (9):

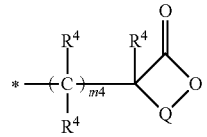

(4)

(5)

(6)

(7)

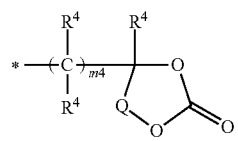

(8)

(9)

wherein in formula (4) through formula (9), $R^4$s each independently represent a hydrogen atom, or a substituent having the same definition as $R^2$ in formula (1); m3 represents an integer of from 1 to 5; m4 represents an integer of from 0 to 5; Q represents a linking group which forms a 4-membered to 8-membered ring together with adjacent atoms; in a case where the substituent represented by formula (3) is carried by $R^1$, * represents the position of bonding to the moiety —Si—O— of the silicon compound; and in a case where the substituent represented by formula (3) is carried by $R^2$, * represents the position of bonding to the moiety —Si— of the silicon compound.

According to a third aspect of the invention, there is provided a non-aqueous electrolyte liquid for a secondary battery such as described in the first aspect or the second aspect of the invention, in which when the silicon compounds represented by the formula (1) and the formula (2) have the substituent represented by the formula (3), $R^3$ in formula (3) is a linear or branched alkyl group; and m1 is 0 while m2 is 1, or m1 is 1 while m2 is 0.

According to a fourth aspect of the invention, there is provided a non-aqueous electrolyte liquid for a secondary battery such as described in any one of the first aspect to the third aspect of the invention, in which the structure of $R^1$ or $R^2$ in formula (1) and formula (2), to which the substituent represented by formula (3) is bonded, is selected from the structures represented by formula (4) and the following formula (5).

According to a fifth aspect of the invention, there is provided a non-aqueous electrolyte liquid for a secondary battery such as described in any one of the first aspect to the fourth aspect of the invention, in which the number of substituents represented by formula (3) in the silicon compounds represented by formula (1) and formula (2) is 1 or 2.

According to a sixth aspect of the invention, there is provided a non-aqueous electrolyte liquid for a secondary battery such as described in any one of the first aspect to the fifth aspect of the invention, in which the metal salt containing an ion of a metal which belongs to Group 1 or Group 2 of the Periodic Table of Elements is a lithium salt.

According to a seventh aspect of the invention, there is provided a non-aqueous electrolyte liquid for a secondary battery such as described in any one of the first aspect to the fifth aspect of the invention, in which the content of the silicon compound represented by formula (1) or formula (2) in the electrolyte liquid is from 20% by mass to 80% by mass.

According to an eighth aspect of the invention, there is provided a non-aqueous electrolyte liquid for a secondary battery such as described in any one of the first aspect to the seventh aspect of the invention, which further includes a phosphorus compound.

According to a ninth aspect of the invention, there is provided a non-aqueous electrolyte liquid for a secondary battery such as described in the eighth aspect of the invention, in which the phosphorus compound is at least one compound selected from the group consisting of a phosphoric acid ester compound, a phosphazene compound, a phosphonic acid ester compound, and a phosphite compound.

According to a tenth aspect of the invention, there is provided a non-aqueous electrolyte liquid for a secondary battery such as described in the ninth aspect of the invention, in which the phosphoric acid ester compound is a compound represented by the following formula (p1).

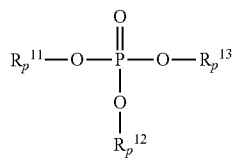
(p1)

In formula (p1), $Rp^{11}$, $Rp^{12}$, and $Rp^{13}$ each independently represent an alkyl group or a phenyl group.

According to an eleventh aspect of the invention, there is provided a non-aqueous electrolyte liquid for a secondary battery such as described in the ninth aspect of the invention, in which the phosphazene compound is a compound having a partial structure represented by the following formula (p2).

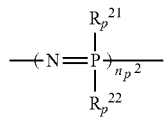
(p2)

In formula (p2), $Rp^{21}$ and $Rp^{22}$ each independently represent a halogen atom, an alkoxy group, or a phenoxy group; and $n_p^2$ represents an integer of 1 or greater.

According to a twelfth aspect of the invention, there is provided a non-aqueous electrolyte liquid for a secondary battery such as described in the ninth aspect of the invention, in which the phosphonic acid ester compound is a compound represented by the following formula (p3).

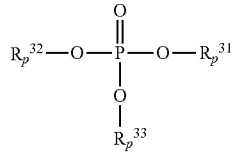
(p3)

In formula (p3), $Rp^{31}$, $Rp^{32}$, and $Rp^{33}$ each independently represent an alkyl group or a phenyl group.

According to a thirteenth aspect of the invention, there is provided a non-aqueous electrolyte liquid for a secondary battery such as described in the ninth aspect of the invention, in which the phosphite compound is a compound represented by the following formula (p4).

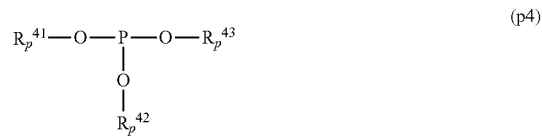
(p4)

In formula (p4), $Rp^{41}$, $Rp^{42}$, and $Rp^{43}$ each independently represent an alkyl group or a phenyl group.

According to a fourteenth aspect of the invention, there is provided a non-aqueous electrolyte liquid for a secondary battery such as described in any one of the ninth aspect to the thirteenth aspect of the invention, in which the content of the phosphorus compound in the electrolyte liquid is from 5% by mass to 40% by mass.

According to a fifteenth aspect of the invention, there is provided a lithium secondary battery including the non-aqueous electrolyte liquid for a secondary battery described in any one of the first aspect to the fourteenth aspect of the invention; a positive electrode capable of insertion and release of lithium ions; and a negative electrode capable of insertion and release, or dissolution and precipitation, of lithium ions.

Since the invention adopts the constitution described above, a non-aqueous electrolyte liquid for a secondary battery having high ion conductibility and a satisfactory lithium ion transport number, and having excellent voltage resistance is provided. Since the electrolyte liquid can be provided by a simple method from easily available raw materials, and when the electrolyte is used, a high output lithium secondary battery can be provided.

Meanwhile, when a substituent (atomic group) is mentioned in the present specification, unless particularly stated otherwise, the substituent may be unsubstituted or may be further substituted. For example, when the expression "alkyl group" is described, the alkyl group is used to mean to include an unsubstituted alkyl group, and an alkyl group which is further substituted. The same also applies to other substituents (atomic groups).

Advantageous Effect of Invention

According to the invention, a non-aqueous electrolyte liquid for a secondary battery, which has excellent voltage resistance and excellent conductibility for ions represented by lithium ion, and may be suitably used in lithium secondary batteries, is provided. Also, according to the invention, a high output lithium secondary battery can be provided by using the non-aqueous electrolyte liquid for a secondary battery of the invention.

BRIEF DESCRIPTION OF DRAWINGS

FIG. 1 is a schematic cross-sectional diagram illustrating an aspect of a bottomed cylindrical-shaped lithium secondary battery that can use the non-aqueous electrolyte liquid for a secondary battery of the invention.

DESCRIPTION OF EMBODIMENTS

Hereinafter, exemplary embodiments of the invention will be described in detail, but the descriptions of the constituent requirements described below constitute an example (representative example) of the embodiments of the invention, and the invention is not intended to be characterized by these matters. Various modifications can be made within the scope of the gist.

[1] Non-Aqueous Electrolyte Liquid for a Secondary Battery

The non-aqueous electrolyte liquid for a secondary battery of the invention includes a metal salt containing an ion of a metal which belongs to Group 1 or Group 2 of the Periodic Table of Elements, and at least one selected from the group consisting of alkoxysilane compounds represented by formula (1) or formula (2) that will be described below [hereinafter, appropriately referred to as particular silicon compounds].

The non-aqueous electrolyte liquid for a secondary battery of the invention can be obtained by dissolving a metal salt containing an ion of a metal which belongs to Group 1 or Group 2 of the Periodic Table of Elements, as represented by a lithium salt, in a particular silicon compound.

The particular silicon compound is a compound which can effectively dissolve a salt of the metal ion that co-exists, and functions as a solvent of the electrolyte liquid.

The non-aqueous electrolyte liquid for a secondary battery of the invention is suitably used in lithium ion batteries.

Hereinafter, the various components included in the non-aqueous electrolyte liquid for a secondary battery of the invention will be described in sequence.

[(A) Compound Selected from Group Consisting of Silicon Compounds Represented by Following Formula (1) or Formula (2)]

The particular silicon compound used in the invention is a compound selected from the group consisting of silicon compounds represented by the following formula (1) or formula (2).

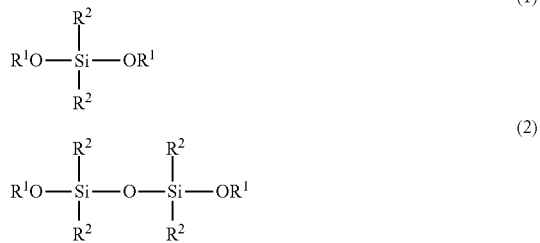

In the above formula (1) and the following formula (2), $R^1$ represents an alkyl group having 1 to 5 carbon atoms.

$R^2$ represents an alkyl group having 1 to 5 carbon atoms, or an $OR^1$ group, that is, an alkoxy group, and $R^1$ and $R^2$ that respectively exist in plural numbers in the compounds may be the same or different from each other. At least one $R^1$ or $R^2$ that is contained in the above formula (1) and the following formula (2) represents an alkyl group having 1 to 5 carbon atoms and having a substituent represented by the following formula (3), or an alkoxy group having 1 to 5 carbon atoms and having a substituent represented by the following formula (3). $R^1$ and $R^2$ may also be linked to each other and form a ring.

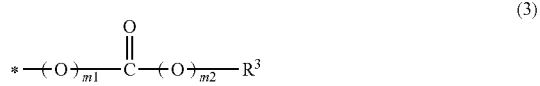

In formula (3), $R^3$ represents an alkyl group having 1 to 5 carbon atoms; and m1 and m2 each independently represent 0 or 1, provided that m1 and m2 are not both zero. * represents the position of bonding to the alkyl group or alkoxy group represented by $R^1$ or $R^2$. One of the atoms carried by $R^3$ and one of the atoms carried by $R^1$ or $R^2$ to which the substituent represented by formula (3) is bonded, may be linked to each other and form a ring.

$R^1$ and $R^3$ in the formula (1), formula (2) and formula (3) each independently represent an alkyl group having 1 to 5 carbon atoms. The alkyl group may be unsubstituted, or may be substituted.

Preferred examples of the alkyl group include a methyl group, an ethyl group, and an isopropyl group.

These alkyl groups may be substituted with a substituent, and preferred examples of the substituent that may be carried by the alkyl group include a halogen atom, an aryl group, a heterocyclic group, a cyano group, a nitro group, an alkoxy group, a silyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- and arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, and a silyl group. Further preferred examples of the substituent include an aryl group, a cyano group, an alkoxy group, a silyloxy group, an alkoxycarbonyloxy group, and a fluorine atom.

$R^2$ represents an alkyl group having 1 to 5 carbon atoms, or an $-OR^1$ group (alkoxy group). When $R^2$ represents an alkyl group, preferred examples thereof include a methyl group, an ethyl group, and an isopropyl group, and a methyl group or an ethyl group is even more preferred.

Furthermore, when $R^2$ represents $-OR^1$, $R^1$ has the same definition as defined above, and represents an alkyl group having 1 to 5 carbon atoms. Preferred examples thereof also include the same examples, and among them, a methyl group or an ethyl group is more preferred. That is, when $R^2$ is an alkoxy group ($-OR^1$), $R^2$ is preferably a methoxy group or an ethoxy group.

At least one $R^1$ or $R^2$ that are contained in formula (1) and formula (2) has a substituent represented by the following formula (3).

That is, in a case in which the substituent represented by formula (3) is carried by R', at least one hydrogen atom in the alkyl group represented by $R^1$ is substituted by a substituent represented by the following formula (3), while in a case in which the substituent represented by formula (3) is carried by $R^2$, $R^2$ in formula (1) or formula (2) represents an alkyl group, and at least one hydrogen atom in the alkyl group represented by $R^2$ is substituted by a substituent represented by the following formula (3).

The silicon compounds represented by the following formula (1) and formula (2) may have two or more substituents represented by formula (3). The number of substituents represented by formula (3) in one molecule of a particular silicon compound is preferably 1 to 5, more preferably 1 to 3, and most preferably 1 or 2.

In formula (3), $R^3$ represents an alkyl group having 1 to 5 carbon atoms, and is preferably a linear or branched alkyl group.

m1 and m2 each independently represent 0 or 1, and m1 and m2 are not both zero at the same time. * represents the position of bonding to the alkyl group represented by $R^1$ or $R^2$.

Meanwhile, from the viewpoint of stability, an aspect in which m1 in formula (3) is 0, while m2 is 1; or an aspect in which m1 is 1, while m2 is 0, is more preferred. That is, in a case where the particular silicon compound has a carbonate structure in the molecule, as time passes, there is a risk that an undesired decarboxylation reaction or the like may occur under the effect of heat. Therefore, the aspect in which the particular silicon compound does not have a carbonate structure such as described above is preferred.

$R^3$ may be linked to $R^1$ or $R^2$ to which the substituent represented by formula (3) are bonded and form a ring; however, an aspect in which a ring is not formed is preferred.

Preferred examples of the structure of $R^1$ or $R^2$ in a case where $R^1$ or $R^2$ in formula (1) or formula (2) has a substituent represented by formula (3), include structures represented by the following formula (4) to the following formula (9).

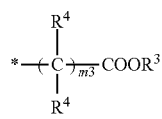

(4)

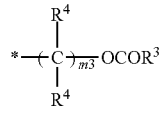

(5)

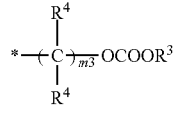

(6)

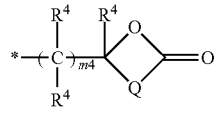

(7)

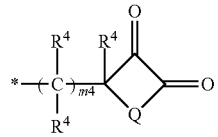

(8)

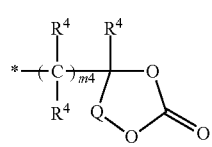

(9)

In formula (4) through formula (9), $R^4$s each independently represents a hydrogen atom, or a substituent having the same definition as $R^2$ in formula (1).

m3 represents an integer of from 1 to 5, and is preferably from 1 to 3. m4 represents an integer of from 0 to 5, and is preferably from 0 to 2.

Q represents a linking group which forms a 4-membered to 8-membered ring together with adjacent atoms, and Q preferably represents an alkylene group having 2 to 5 carbon atoms, an ether group or the like. An alkylene group having 2 to 3 carbon atoms is more preferred.

Regarding symbol *, when the substituent represented by formula (3) is carried by $R^1$, * represents the position of bonding to the moiety —Si—O— in the silicon compound, and when the substituent represented by formula (3) is carried by $R^2$, * represents the position of bonding to the moiety —Si— of the silicon compound.

Meanwhile, from the viewpoint of enhancing ionic conductivity, it is preferable that $R^1$ or $R^2$ having the substituent represented by formula (3) do not have a ring structure, and from this point of view, it is suitable that the substituent be selected from the substituents represented by formula (4) to formula (6). When the particular silicon compound has a ring structure in the molecule, there is a risk that the viscosity of the electrolyte liquid may increase, and the mobility of lithium ions in the electrolyte liquid may decrease. For this reason, it is preferable that the substituent in the particular silicon compound do not have a ring structure.

Furthermore, from the viewpoint of stability, as discussed above, since it is preferable that the particular silicon compound do not have a carbonate structure in the molecule, from the viewpoints of stability and ion conductibility, an aspect in which $R^1$ or $R^2$ containing the substituent represented by formula (3) does not contain a carbonate structure in which $R^3$ and $R^4$ do not have a ring structure, that is, a structure represented by formula (4) or formula (5), is more preferred.

Examples of the particular silicon compound according to the invention [exemplary compounds (Si-1) to (Si-20)] will be listed below, but the invention is not intended to be limited to these.

(Si-1)

(Si-2)

(Si-3)

(Si-4)

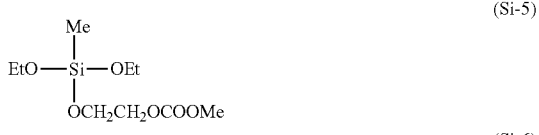

(Si-5)

(Si-6)

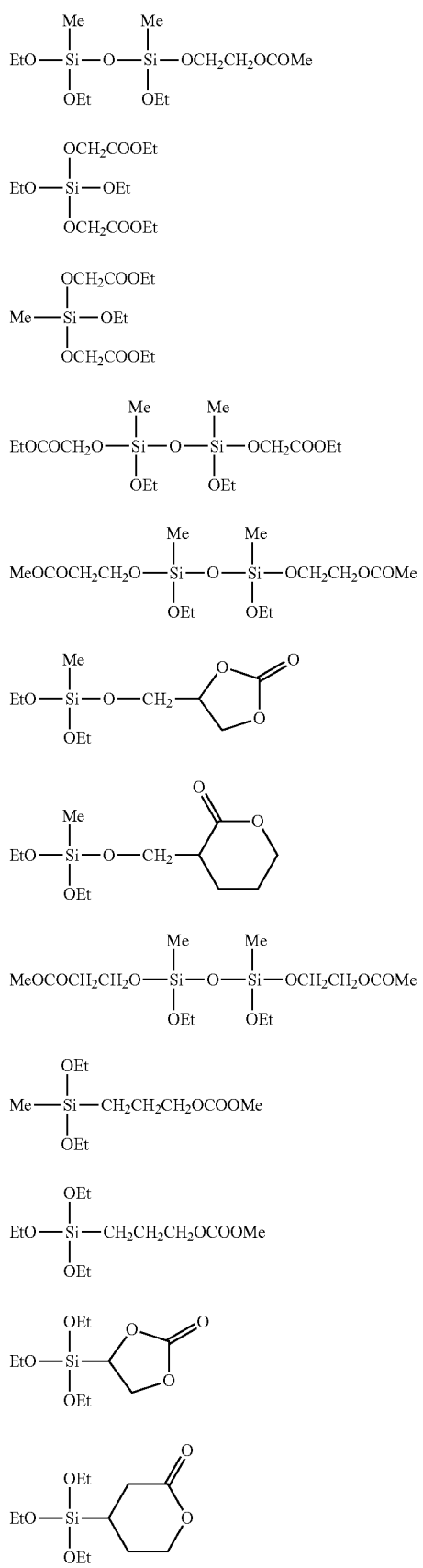
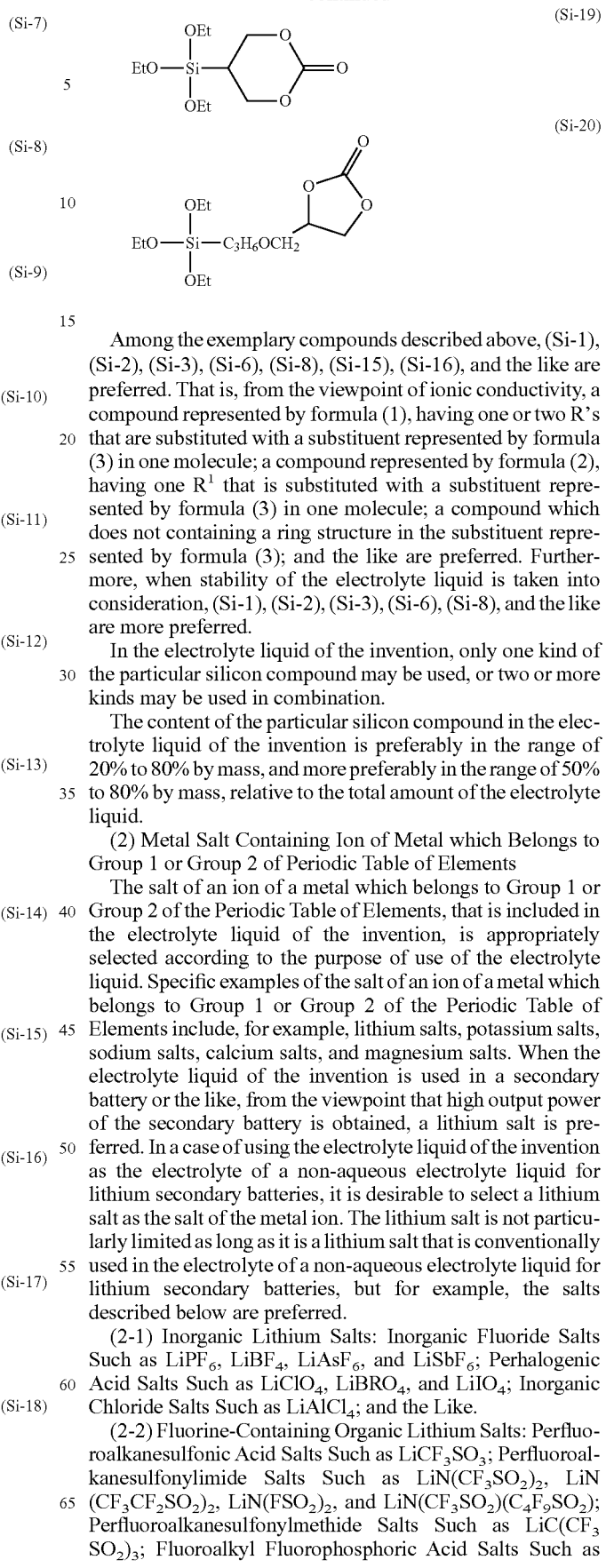

Among the exemplary compounds described above, (Si-1), (Si-2), (Si-3), (Si-6), (Si-8), (Si-15), (Si-16), and the like are preferred. That is, from the viewpoint of ionic conductivity, a compound represented by formula (1), having one or two R's that are substituted with a substituent represented by formula (3) in one molecule; a compound represented by formula (2), having one $R^1$ that is substituted with a substituent represented by formula (3) in one molecule; a compound which does not containing a ring structure in the substituent represented by formula (3); and the like are preferred. Furthermore, when stability of the electrolyte liquid is taken into consideration, (Si-1), (Si-2), (Si-3), (Si-6), (Si-8), and the like are more preferred.

In the electrolyte liquid of the invention, only one kind of the particular silicon compound may be used, or two or more kinds may be used in combination.

The content of the particular silicon compound in the electrolyte liquid of the invention is preferably in the range of 20% to 80% by mass, and more preferably in the range of 50% to 80% by mass, relative to the total amount of the electrolyte liquid.

(2) Metal Salt Containing Ion of Metal which Belongs to Group 1 or Group 2 of Periodic Table of Elements The salt of an ion of a metal which belongs to Group 1 or Group 2 of the Periodic Table of Elements, that is included in the electrolyte liquid of the invention, is appropriately selected according to the purpose of use of the electrolyte liquid. Specific examples of the salt of an ion of a metal which belongs to Group 1 or Group 2 of the Periodic Table of Elements include, for example, lithium salts, potassium salts, sodium salts, calcium salts, and magnesium salts. When the electrolyte liquid of the invention is used in a secondary battery or the like, from the viewpoint that high output power of the secondary battery is obtained, a lithium salt is preferred. In a case of using the electrolyte liquid of the invention as the electrolyte of a non-aqueous electrolyte liquid for lithium secondary batteries, it is desirable to select a lithium salt as the salt of the metal ion. The lithium salt is not particularly limited as long as it is a lithium salt that is conventionally used in the electrolyte of a non-aqueous electrolyte liquid for lithium secondary batteries, but for example, the salts described below are preferred.

(2-1) Inorganic Lithium Salts: Inorganic Fluoride Salts Such as $LiPF_6$, $LiBF_4$, $LiAsF_6$, and $LiSbF_6$; Perhalogenic Acid Salts Such as $LiClO_4$, $LiBrO_4$, and $LiIO_4$; Inorganic Chloride Salts Such as $LiAlCl_4$; and the Like.

(2-2) Fluorine-Containing Organic Lithium Salts: Perfluoroalkanesulfonic Acid Salts Such as $LiCF_3SO_3$; Perfluoroalkanesulfonylimide Salts Such as $LiN(CF_3SO_2)_2$, $LiN(CF_3CF_2SO_2)_2$, $LiN(FSO_2)_2$, and $LiN(CF_3SO_2)(C_4F_9SO_2)$; Perfluoroalkanesulfonylmethide Salts Such as $LiC(CF_3SO_2)_3$; Fluoroalkyl Fluorophosphoric Acid Salts Such as Li[PF$_5$(CF$_2$CF$_2$CF$_3$)], Li[PF$_4$(CF$_2$CF$_2$CF$_3$)$_2$], Li[PF$_3$(CF$_2$CF$_2$CF$_3$)$_3$], Li[PF$_5$(CF$_2$CF$_2$CF$_2$CF$_3$)], Li[PF$_4$(CF$_2$CF$_2$CF$_2$CF$_3$)$_2$], Li[PF$_3$(CF$_2$CF$_2$CF$_2$CF$_3$)$_3$]; and the Like.

(2-3) Oxalatoborate Salts: Lithium Bis(Oxalate)Borate, Lithium Difluoro(Oxalate)Borate, and the Like.

Among these, LiPF$_6$, LiBF$_4$, LiAsF$_6$, LiSbF$_6$, LiClO$_4$, Li(Rf$^1$SO$_3$), LiN(Rf$^1$SO$_2$)$_2$, LiN(FSO$_2$)$_2$, and LiN(Rf$^1$SO$_2$)(Rf$^2$SO$_2$)$_2$ are preferred; and lithium imide salts such as LiN(Rf$^1$SO$_2$)$_2$, LiN(FSO$_2$)$_2$, and LiN(Rf$^1$SO$_2$)(Rf$^2$SO$_2$)$_2$ are more preferred. Here, Rf$^1$ and Rf$^2$ each represent a perfluoroalkyl group.

Meanwhile, as for the lithium salt that is used in the electrolyte liquid, one kind may be used alone, or any two or more kinds may be used in combination.

The content of the salt containing an ion of a metal which belongs to Group 1 or Group 2 of the Periodic Table of Elements in the electrolyte liquid is preferably a content which gives the preferred salt concentration that will be described below for the method for preparing the electrolyte liquid. The salt concentration is selected according to the purpose of the electrolyte liquid, but the content is generally 10% by mass to 50% by mass, and more preferably 15% by mass to 30% by mass, relative to the total mass of the electrolyte liquid.

(3) Method for Preparing Electrolyte Liquid

Next, a representative method for preparing the electrolyte liquid of the invention will be explained by taking the case of using a lithium salt as the (2) salt of a metal ion, as an example.

The electrolyte liquid of the invention is prepared by dissolving a lithium salt and various additives that are added as desired, in the particular silicon compound.

(i) Composition and Properties of Electrolyte Liquid

In regard to the lithium salt concentration in the electrolyte liquid thus prepared, since the viscosity of the electrolyte liquid increases as the concentration increases, there exists a concentration range adequate for exhibiting high ionic conductivity. A preferred concentration range is from 10% by mass to 50% by mass, and more preferably from 15% by mass to 30% by mass, relative to the total mass of the electrolyte liquid.

The viscosity [30° C.] of the electrolyte liquid of the invention is controlled by the structure of the particular silicon compound, and the viscosity is preferably 20 mPa·s or less, and more preferably in the range of 10 mPa·s to 1 mPa·s.

(ii) Synthesis Method for Particular Silicon Compound

The particular silicon compound that can be used in the invention can be easily synthesized by known methods, for example, two methods that will be described below.

A first method applicable to the synthesis of the particular silicon compound is, as indicated in the following scheme 1, a method of subjecting (4) an alkoxysilane compound and (5) an alcohols having a substituent represented by formula (3) in the molecule, to a substitution reaction.

Furthermore, a second method applicable to the synthesis of the particular silicon compound is, as indicated in the following scheme 2, a method of carrying out a hydrosilylation reaction by using (6) an alkoxyhydrosilane compound and (7) an olefins having a substituent represented by formula (3) in the molecule.

The particular silicon compound that is used in the invention can be easily synthesized by the first method or the second method.

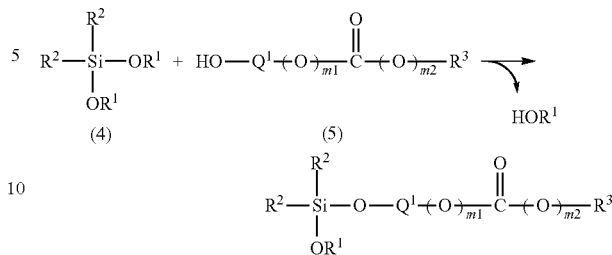

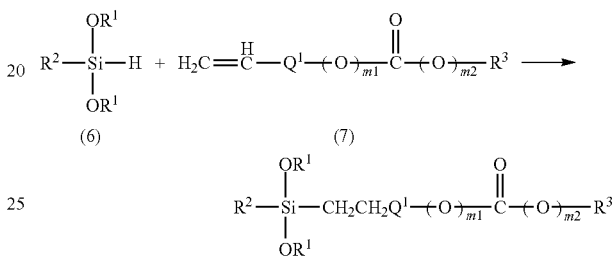

In the above schemes, R$^1$ and R$^3$ each independently represent an alkyl group; R$^2$ represents an alkyl group or an OR$^1$ group. Meanwhile, the alkyl group represented by R$^1$ to R$^3$ may be the same alkyl group as those exemplified for the formula (1), and preferred examples thereof are also the same as defined above. Q$^1$ represents a divalent linking group or a single bond, and examples of the divalent linking group include an alkylene group, an alkylene group containing a carbonyl bond in the chain, and an alkyloxy group. Q$^1$ is preferably a single bond or an alkylene group.

m1 and m2 each independently represent 0 or 1, and m1 and m2 are not both zero at the same time.

(ii) Specific Examples of Compounds Used in Raw Materials

Specific examples of raw material compounds that are used when the particular silicon compound is prepared by the synthesis methods represented by the scheme 1 and the scheme 2 will be described below, but the invention is not intended to be limited to these.

(4) Alkoxysilane Compounds (4-1) Si(OMe)$_4$, (4-2) Si(OEt)$_4$,
(4-3) Si(OPr)$_4$, (4-4) Si(OBu)$_4$,
(4-5) MeSi(OMe)$_3$, (4-6) MeSi(OEt)$_3$,
(4-7) Me$_2$Si(OMe)$_2$
(4-8) Me(EtO)$_2$Si—O—Si(OEt)$_2$Me, and the Like.

(5) Alcohols Containing Substituent Represented by Formula (3) in Molecule (5-1) HOCH$_2$COOMe, (5-2) HOCH$_2$COOEt,
(5-3) HOCH$_2$CH$_2$OCOCH$_3$, (5-4) HOCH$_2$CH$_2$OCOOCH$_3$,
(5-5) HOCH$_2$CH(COOMe)$_2$, and the Like (6) Alkoxyhydrosilane Compounds (6-1) (MeO)$_3$SiH, (6-2) (EtO)$_3$SiH,
(6-3) Me(EtO)$_3$SiH (7) Olefins Containing Substituent Represented by Formula (3) in Molecule (7-1) CH$_2$=CHCH$_2$OCOOMe,
(7-2) CH$_2$=CHCH$_2$OCOMe, (7-3) CH$_2$=CHCOOEt,
(7-4) CH$_2$=C(Me)OCOCH$_3$, and the Like Meanwhile, in regard to the raw material compounds described above, Me represents a methyl group; Et represents an ethyl group; OMe or MeO represents a methoxy group; OEt or EtO represents an ethoxy group; OPr represents a propoxy group; and OBu represents a butoxy group.

(8) Phosphorus Compound

The electrolyte liquid of the invention may also contain a phosphorus compound. When a phosphorus compound is used in the electrolyte liquid, the viscosity of the electrolyte liquid decreases, and due to the decrease in viscosity, there is provided an effect that ionic conductivity is enhanced, and flame retardancy is improved. Furthermore, when a preferred phosphorus compound that will be described below is used in combination, an enhancement of the charging-discharging characteristics can be observed. It is conceived that this is because a thin coating film (SEI) that covers the negative electrode and the positive electrode is formed at the time of battery charging.

Examples of the phosphorus compound used in the electrolyte liquid of the invention include (8-1) a phosphoric acid ester compound, (8-2) a phosphazene compound, (8-3) a phosphonic acid ester compound, and (8-4) a phosphate compound, and one kind or two or more kinds may be selected from the group consisting of these compounds for use.

Preferred phosphorus compounds will be described below.

(8-1) Phosphoric Acid Ester Compound

The phosphoric acid ester compound is preferably a compound represented by the following formula (p1).

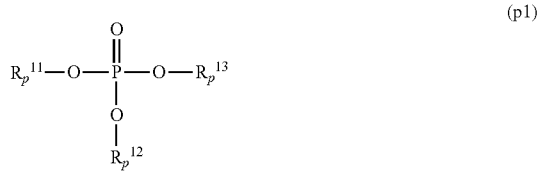

In formula (p1), $Rp^{11}$, $Rp^{12}$, and $Rp^{13}$ each independently represent an alkyl group or an aryl group. Preferably, two of $Rp^{11}$, $Rp^{12}$, and $Rp^{13}$ represent the same substituent, and more preferably, all the three represent the same substituent.

When at least one $Rp^{11}$, $Rp^{12}$, or $Rp^{13}$ represents an alkyl group, the alkyl group is preferably an alkyl group having 1 to 8 carbon atoms. Furthermore, when at least one $Rp^{11}$, $Rp^{12}$, or $Rp^{13}$ represents an aryl group, the aryl group is preferably an aryl group having 6 to 12 carbon atoms. Among them, it is preferable that $Rp^{11}$, $Rp^{12}$, and $Rp^{13}$ each represent an alkyl group.

More specifically, an unsubstituted alkyl group is preferably a methyl group, an ethyl group, a propyl group, an isopropyl group, a butyl group, an isobutyl group, or a tert-butyl group, and is more preferably a methyl group or an ethyl group.

A substituted alkyl group is preferably a halogenated alkyl group, particularly preferably a fluorinated alkyl group, and even more preferably a trifluoromethyl group, a difluoromethyl group, a monofluoromethyl group, a trifluoroethyl group, or a tetrafluoropropyl group.

Specific preferred examples of the phosphoric acid ester compound include compounds in which $Rp^{11}$, $R^{12}$ and $R^{13}$ each independently represent any one of a methyl group, an ethyl group, a trifluoromethyl group and a trifluoroethyl group, and more preferred examples include compounds in which all $Rp^{11}$, $Rp^{12}$ and $R^{13}$ represent a methyl group or a trifluoroethyl group.

(8-2) Phosphazene Compound

The phosphazene compound is preferably a compound having a partial structure represented by the following formula (p2).

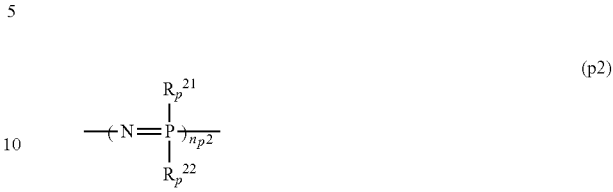

In formula (p2), $Rp^{21}$ and $Rp^{22}$ each independently represent a halogen atom, an alkoxy group, or an aryloxy group. $n_p^2$ represents an integer of 1 or greater, and $n_p^2$ is preferably an integer of from 1 to 4, and particularly preferably 3 or 4.

When at least one $Rp^{21}$ or $Rp^{22}$ represents a halogen atom, the halogen atom is preferably a chlorine atom or a fluorine atom, and more preferably a fluorine atom. Furthermore, when at least one $Rp^{21}$ or $Rp^{22}$ represents an alkoxy group, the alkoxy group is preferably an alkoxy group having 1 to 8 carbon atoms. When at least one $Rp^{21}$ or $Rp^{22}$ represents an aryloxy group, the aryloxy group is preferably an aryloxy group having 6 to 12 carbon atoms. Among them, it is preferable that $Rp^{21}$ and $Rp^{22}$ each independently represent a halogen atom or an alkoxy group.

The alkoxy group is preferably a methoxy group, an ethoxy group, a propyloxy group, an isopropyloxy group, a butoxy group, an isobutoxy group, a tert-butoxy group, or a halogenated alkyloxy group, and is more preferably a methoxy group, an ethoxy group, or a halogenated alkyloxy group. The halogenated alkyloxy group is more preferably a trifluoromethoxy group, a trifluoroethoxy group, or a tetrafluoropropyloxy group.

$Rp^{21}$ and $Rp^{22}$ may be the same or different from each other but according to a preferred aspect, at least one $Rp^{21}$ or $Rp^{22}$ is a fluorine atom.

Examples of the phosphazene compound having a partial structure represented by e formula (p2) include compounds having a cyclic structure with the ends being linked to each other, in which any one of $Rp^{21}$ and $Rp^{22}$ is a fluorine atom, while the other is a methoxy group, and $n_p^2$ is 3 or 4.

(8-3) Phosphonic Acid Ester Compound

The phosphonic acid ester compound is preferably a compound represented by the following formula (p3).

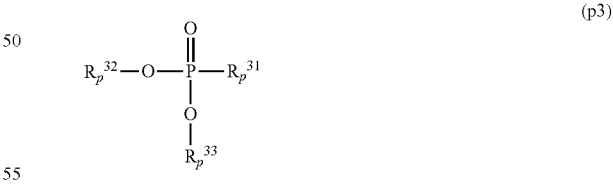

In formula (p3), $Rp^{31}$, $Rp^{32}$, and $Rp^{33}$ each independently represent an alkyl group or an aryl group.

$Rp^{31}$, $Rp^{32}$, and $Rp^{33}$ may be the same or different from each other, but preferably, $Rp^{32}$ and $Rp^{33}$ are the same.

When at least one $Rp^{31}$, $Rp^{32}$, or $Rp^{33}$ represents an alkyl group, the alkyl group is preferably an alkyl group having 1 to 8 carbon atoms. When at least one $Rp^{31}$, $Rp^{32}$ or $Rp^{33}$ represents an aryl group, the aryl group is preferably an aryl group having 6 to 12 carbon atoms. Among them, it is preferable that $Rp^{31}$, $Rp^{32}$, and $Rp^{33}$ each independently represent an alkyl group.

Preferred examples of an unsubstituted alkyl group in a case where at least one $Rp^{31}$, $Rp^{32}$, or $Rp^{33}$ represents an alkyl group, include a methyl group, an ethyl group, a propyl group, an isopropyl group, a butyl group, an isobutyl group, and a tert-butyl group, and the unsubstituted alkyl group is more preferably a methyl group or an ethyl group. A substituted alkyl group is preferably a halogenated alkyl group, particularly preferably a fluorinated alkyl group, and more preferably a trifluoromethyl group, a difluoromethyl group, a monofluoromethyl group, a trifluoroethyl group, or a tetrafluoropropyl group.

A specific preferred embodiment of the phosphonic acid ester compound is a compound in which $Rp^{31}$ represents a methyl group, and $Rp^{32}$ and $Rp^{33}$ both represent a trifluoroethyl group.

(8-4) Phosphite Compound

The phosphite compound may be a compound represented by the following formula (p4).

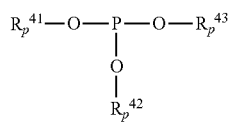
(p4)

In formula (p4), $Rp^{41}$, $Rp^{42}$, and $Rp^{43}$ each independently represent an alkyl group or a phenyl group.

$Rp^{41}$, $Rp^{42}$, and $Rp^{43}$ may be the same or different from each other; however, according to a preferred aspect, any two of $Rp^{41}$, $Rp^{42}$, and $Rp^{43}$ are the same, and according to a more preferred aspect, all the three represent the same substituent.

When at least one $Rp^{41}$, $Rp^{42}$, or $Rp^{43}$ represents an alkyl group, the alkyl group is preferably an alkyl group having 1 to 8 carbon atoms. Furthermore, when at least one $Rp^{41}$, $Rp^{42}$, or $Rp^{43}$ represents an aryl group, the aryl group is preferably an aryl group having 6 to 12 carbon atoms. Among them, it is preferable that $Rp^{41}$, $Rp^{42}$, and $Rp^{43}$ each independently represent a phenyl group or an alkyl group.

Preferred examples of an unsubstituted alkyl group in a case where at least one $Rp^{31}$, $Rp^{32}$, or $Rp^{33}$ represents an alkyl group, include a methyl group, an ethyl group, a propyl group, an isopropyl group, a butyl group, an isobutyl group, and a tert-butyl group, and the unsubstituted alkyl group is more preferably a methyl group or an ethyl group. A substituted alkyl group is preferably a halogenated alkyl group, particularly preferably a fluorinated alkyl group, and more preferably a trifluoromethyl group, a difluoromethyl group, a monofluoromethyl group, a trifluoroethyl group, or a tetrafluoropropyl group.

A specific preferred example of the phosphite compound may be a compound in which $Rp^{41}$, $Rp^{42}$, and $Rp^{43}$ each independently represent a methyl group, an ethyl group, or a phenyl group, and more preferably all of $Rp^{41}$, $Rp^{42}$, and $Rp^{43}$ represent a methyl group.

Hereinafter, specific preferred examples of the phosphorus compound [exemplary compounds (A1) to (A5)] that can be used in the electrolyte liquid of the invention will be listed below, but the invention is not intended to be limited to these.

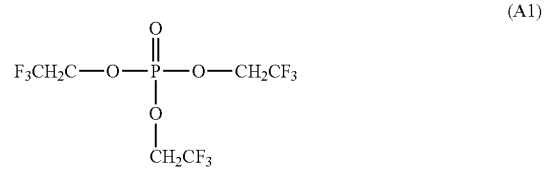
(A1)

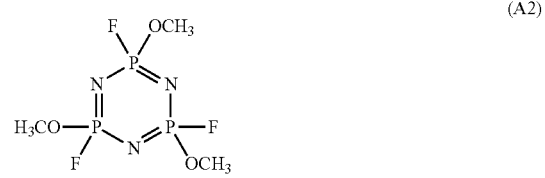
(A2)

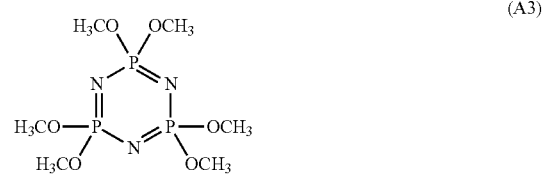
(A3)

(A4)

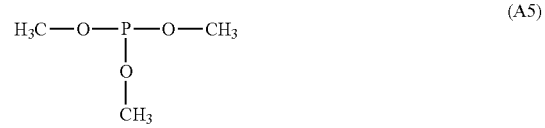
(A5)

Regarding the phosphorus compound, only one kind thereof may be included in the electrolyte liquid, or two or more kinds thereof may be included.

The phosphorus compound may be added at any time point during the preparation process for the electrolyte liquid, but it is preferable to add the phosphorus compound at the same time when the lithium salt is added.

The content of the phosphorus compound is desirably in the range of from 5% by mass to 40% by mass relative to the total amount of the electrolyte liquid. Preferably, the content is in the range of from 5% by mass to 30% by mass, and particularly preferably in the range of from 10% by mass to 20% by mass.

When the amount of addition is 5% by mass or greater, the effect of enhancing flame retardancy through the addition of the phosphorus compound is sufficiently exhibited, and when the amount of addition is 40% by mass or less, the battery characteristics, particularly charging-discharging characteristics, are maintained at a satisfactory level.

The electrolyte liquid of the invention containing a particular siloxane oligomer is prepared as described above. Since the non-aqueous electrolyte liquid for a secondary battery of the invention obtained in this manner has both satisfactory ion conductibility and satisfactory ion transport number, the non-aqueous electrolyte liquid is suitably used in battery applications where high ion conductibility is required, and among them, the non-aqueous electrolyte liquid is useful as an electrolyte liquid for lithium secondary batteries.

[2] Lithium Secondary Battery

The lithium secondary battery of the invention includes the non-aqueous electrolyte liquid for a secondary battery of the invention as described above, a positive electrode capable of insertion and release of lithium ions, and a negative electrode capable of insertion and discharge, or dissolution and precipitation, of lithium ions.

In addition to these members, the lithium secondary battery may also be constructed to include a separator that is disposed between the positive electrode and the negative electrode, current collector terminals, and an external case, in consideration of the purpose of using the battery, the form of the electric potential, and the like. If necessary, a protective element may also be mounted in at least any one side of the interior of the battery and the exterior of the battery.

The configuration of the lithium secondary battery of the invention will be described in detail below.

(1) Battery Shape

There are no particular limitations on the battery shape that is applied to the lithium secondary battery of the invention, and examples of the shape include a bottomed cylindrical shape, a bottomed rectangular shape, a thin flat shape, a sheet shape, and a paper shape. The lithium secondary battery of the invention may have any of these shapes. Furthermore, an atypical shape such as a horseshoe shape or a comb shape, which is designed in consideration of the form of the system or device to which the lithium secondary battery is incorporated, may also be used.

Among them, from the viewpoint of efficiently releasing the heat inside the battery to the outside, a rectangular shape such as a bottomed rectangular shape or a thin flat shape, which has at least one relatively flat and large-sized surface, is preferred.

In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery.

With regard to the bottomed rectangular shape, it is preferable that the value of the ratio of twice the area of the largest surface, S (the product of the width and the height of the external dimension excluding terminal areas, unit: $cm^2$) and the external thickness of the battery, T (unit: cm), 2S/T, be 100 or greater, and more suitably 200 or greater. By having the largest surface made large, even in the case of batteries of high output power and high capacity, characteristics such as cycle characteristics and high temperature storage can be enhanced, and also, the heat dissipation efficiency at the time of abnormal heat generation can be increased. Thus, it is advantageous from the viewpoint that "valve action" or "bursting" can be prevented.

(2) Battery-Constituting Members

The lithium secondary battery of the invention is constituted to include basic members such as (a) an electrolyte liquid, (b) an electrode mixture of a positive electrode and a negative electrode, and (c) a separator. These various members will be described below. The lithium secondary battery of the invention includes at least the non-aqueous electrolyte liquid for batteries of the invention as the (a) electrolyte liquid.

(a) Electrolyte Liquid

The electrolyte liquid used in the lithium secondary battery of the invention includes, as a main component, the non-aqueous electrolyte liquid for a secondary battery of the invention which is prepared by the method described above and contains at least a particular siloxane oligomer and a lithium salt as an electrolyte salt.

That is, the (a) electrolyte liquid is a non-aqueous electrolyte liquid for a secondary battery, containing the particular siloxane oligomer and a lithium salt as an electrolyte salt.

The electrolyte salt used in the non-aqueous electrolyte liquid for a secondary battery is the salt of an ion of a metal which belongs to Group 1 or Group 2 of the Periodic Table of Elements as described above, and the salts described in detail in the exemplary embodiment of the non-aqueous electrolyte liquid for a secondary battery of the invention can be used.

Furthermore, in the (a) electrolyte liquid used in the lithium secondary battery of the invention, the performance of the electrolyte liquid can be further enhanced by adding a solvent that will be described below and other additives to the electrolyte liquid, to the extent that the effect of the invention is not impaired.

(a-1) Solvent for Electrolyte Liquid

The electrolyte liquid prepared by the method of the invention can be directly used as an electrolyte liquid for lithium secondary batteries, but a non-aqueous organic solvent that is generally used for lithium secondary batteries may be further added to the electrolyte liquid.

Suitable examples of such a solvent include carbonate compounds such as ethylene carbonate and propylene carbonate; heterocyclic compounds such as 3-methyl-2-oxazolidinone; ether compounds such as dioxane and diethyl ether; chain-like ethers such as ethylene glycol dialkyl ethers, propylene glycol dialkyl ethers, polyethylene glycol dialkyl ethers, and polypropylene glycol dialkyl ethers; alcohols such as methanol, ethanol, ethylene glycol monoalkyl ethers, propylene glycol monoalkyl ethers, polyethylene glycol monoalkyl ethers, and polypropylene glycol monoalkyl ethers; polyhydric alcohols such as ethylene glycol, propylene glycol, polyethylene glycol, polypropylene glycol, and glycerin; nitrile compounds such as acetonitrile, glutarodinitrile, methoxyacetonitrile, propionitrile, and benzonitrile; esters such as carboxylic acid esters; and aprotic polar substances such as dimethyl sulfoxide and sulfolane.

Among them, carbonate compounds such as ethylene carbonate and propylene carbonate; heterocyclic compounds such as 3-methyl-2-oxazolidinone; nitrile compounds such as acetonitrile, glutarodinitrile, methoxyacetonitrile, propionitrile, and benzonitrile; and esters are particularly preferred. These may be used singly, or two or more kinds may be used in combination.

In regard to the properties of the preferred solvents described above, from the viewpoint of durability enhancement due to the resistance to volatilization, it is preferable that the boiling point at normal pressure (1 atmosphere) be 200° C. or higher, more preferably 250° C. or higher, and even more preferably 270° C. or higher.

The amount of addition used when the organic solvent is added is preferably from 1% by mass to 50% by mass, and more preferably from 5% by mass to 40% by mass, relative to the amount of the electrolyte liquid of the invention.

Since the electrolyte liquid of the invention has a satisfactory lithium ion transport number, a balance is achieved excellently between ionic conductivity and lithium ion transport number as compared with conventional electrolyte liquids, even if the electrolyte liquid does not contain an organic solvent, or if a small amount of an organic solvent is added.

(a-2) Functional Additives

In the electrolyte liquid according to the invention, various additives can be used in accordance with the purpose in order to enhance the performance of the battery, to the extent that the effect of the invention is not impaired.

As for such additives, functional additives such as an overcharge preventing agent, a negative electrode film forming agent, and a positive electrode protective agent may be used.

Examples of the compounds that are used as the functional additives include, for example, overcharge preventing agents including aromatic compounds such as biphenyl, alkylbiphenyl, terphenyl, a partial hydrogenation product of terphenyl, cyclohexylbenzene, t-butylbenzene, t-amylbenzene, diphenyl ether, and dibenzofuran; partial fluorides of the aromatic compounds, such as 2-fluorobiphenyl, o-cyclohexylfluorobenzene, and p-cyclohexylfluorobenzene; fluorine-containing anisole compounds such as 2,4-difluoroanisole, 2,5-difluoroanisole, 2,6-difluoroanisole, and 3,5-difluoroanisole;

negative electrode film forming agents such as vinylene carbonate, vinylethylene carbonate, fluoroethylene carbonate, trifluoropropylene carbonate, succinic anhydride, glutaric anhydride, maleic anhydride, citraconic anhydride, glutaconic anhydride, itaconic anhydride, and cyclohexanedicarboxylic acid anhydride; and positive electrode protective agents such as ethylene sulfite, propylene sulfite, dimethyl sulfite, propanesultone, butanesultone, methyl methanesulfonate, busulfan, methyl toluenesulfonate, dimethyl sulfate, ethylene sulfate, sulfolane, dimethylsulfone, diethylsulfone, dimethyl sulfoxide, diethylsulfoxide, tetramethylene sulfoxide, diphenyl sulfide, thioanisole, diphenyl disulfide, and dipyridinium disulfide.

Preferred examples of the overcharge preventing agent include aromatic compounds such as biphenyl, alkylbiphenyl, terphenyl, a partial hydrogenation product of terphenyl, cyclohexylbenzene, t-butylbenzene, t-amylbenzene, diphenyl ether, and dibenzofuran. Two or more kinds of these may be used in combination. When two or more kinds thereof are used in combination, it is preferable to use, in particular, cyclohexylbenzene or terphenyl (or a partial hydrogenation product thereof) and t-butylbenzene or t-amylbenzene in combination.

Preferred examples of the negative electrode film forming agent include vinylene carbonate, vinylethylene carbonate, fluoroethylene carbonate, succinic anhydride, and maleic anhydride. Two or more kinds of these may be used in combination. When two or more kinds thereof are used, combinations of vinylene carbonate with vinylethylene carbonate, fluoroethylene carbonate, succinic anhydride or maleic anhydride are preferred.

Preferred examples of the positive electrode protective agent include ethylene sulfide, propylene sulfite, propanesultone, butanesultone, methyl methanesulfonate, and busulfan. Two or more kinds of these may be used in combination.

Furthermore, a combined use of a negative electrode film forming agent and a positive protective agent, or a combined use of an overcharge preventing agent, a negative electrode film forming agent, and a positive electrode protective agent is particularly preferred.

There are no particularly limitations on the contents of the functional additives in the non-aqueous electrolyte liquid, but the contents are respectively preferably 0.01% by mass or greater, particularly preferably 0.1% by mass or greater, and more preferably 0.2% by mass or greater relative to the total amount of the non-aqueous electrolyte liquid. The upper limit is preferably 5% by mass or less, particularly preferably 3% by mass or less, and more preferably 2% by mass or less. By adding these compounds, bursting and ignition of the battery at the time of abnormality due to overcharging can be suppressed, or the capacity retention characteristics or cycle characteristics after high temperature storage can be enhanced.

(b) Electrode Mixtures

An electrode mixture is a product obtained by applying an active substance, and a dispersion of an electroconductive agent, a binder, a filler and the like on a current collector. For a lithium battery, a positive electrode mixture in which the active substance is a positive electrode active substance, and a negative electrode mixture in which the active substance is a negative electrode active substance are used.

Next, a positive electrode active substance, a negative electrode active substance, an electroconductive agent, a binder, a filler, and a current collector, which constitute the electrode mixture, will be explained.

(b-1) Positive Electrode Active Substance

The non-aqueous electrolyte liquid for a secondary battery of the invention may include a particulate positive electrode active substance. As the positive electrode active substance used in the invention, a transition metal oxide which is capable of reversible insertion and release of lithium ions can be used, but it is preferable to use a lithium-containing transition metal oxide. Suitable examples of a lithium-containing transition metal oxide that is preferably used as a positive active substance in the invention, include oxides containing one or more of lithium-containing Ti, lithium-containing V, lithium-containing Cr, lithium-containing Mn, lithium-containing Fe, lithium-containing Co, lithium-containing Ni, lithium-containing Cu, lithium-containing Mo, and lithium-containing W. Furthermore, alkali metals other than lithium (elements of Group 1 (Ia) and Group 2 (IIa) of the Periodic Table of Elements), and/or Al, Ga, In, Ge, Sn, Pb, Sb, Bi, Si, P, B and the like may also be incorporated. The amount of incorporation is preferably 0% to 30% by mole relative to the amount of the transition metal.

Among the lithium-containing transition metal oxides that are preferably used as the positive electrode active substance, a substance synthesized by mixing a lithium compound and a transition metal compound (herein, the transition metal refers to at least one selected from Ti, V, Cr, Mn, Fe, Co, Ni, Mo, and W) such that the total molar ratio of lithium compound/transition metal compound is 0.3 to 2.2.

Furthermore, among the lithium compound/transition metal compound, materials containing $Li_gM3O_2$ (wherein M3 represents one or more elements selected from Co, Ni, Fe, and Mn; and g represents 0 to 1.2), or materials having a spinel structure represented by $Li_hM4_2O$ (wherein M4 represents Mn; and h represents 0 to 2) are particularly preferred. As M3 and M4 described above, Al, Ga, In, Ge, Sn, Pb, Sb, Bi, Si, P, B, or the like may also be incorporated in addition to the transition metal. The amount of incorporation is preferably 0% to 30% by mole relative to the amount of the transition metal.

Among the materials containing $Li_gM3O_2$ and the materials having a spinel structure represented by $Li_hM4_2O$, $Li_gCoO_2$, $Li_gNiO_2$, $Li_gMnO_2$, $Li_gCo_jNi_{1-j}O_2$, $Li_hMn_2O_4$, $LiNi_jMn_{1-j}O_2$, $LiCo_jNi_hAl_{1-j-h}O_2$, $LiCo_jNi_hMn_{1-j-h}O_2$, $LiMn_hAl_{2-h}O_4$, and $LiMn_hNi_{2-h}O_4$ (wherein in the respective formulas, g represents 0.02 to 1.2; j represents 0.1 to 0.9; and h represents 0 to 2) are particularly preferred. Here, the g value and the h value are values prior to the initiation of charging and discharging, and are values that increase or decrease as charging or discharging occurs. Specific examples include $LiNi_{0.5}Mn_{0.5}O_2$, $LiNi_{0.85}CO_{0.01}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

Preferred examples of the transition metal of the lithium-containing transition metal phosphate compound include V, Ti, Cr, Mn, Fe, Co, Ni, and Cu, and specific examples of the compound include iron phosphates such as $LiFePO_4$, $Li_3Fe_2$ $(PO_4)_3$, and $LiFeP_2O_7$; cobalt phosphates such as $LiCoPO_4$; and compounds in which a portion of the transition metal atoms that constitute the main component of these lithium-transition metal phosphate compounds has been substituted by another metal such as Al, Ti, V, Cr, Mn, Fe, Co, Li, Ni, Cu, Zn, Mg, Ga, Zr, Nb, or Si.

The positive electrode active substance can be synthesized by a method of mixing a lithium compound and a transition metal compound, and calcining the mixture, or by a solution reaction; however, a compound obtained by a calcination method is particularly preferred.

In the calcination method that is applied to the synthesis of the positive electrode active substance according to the invention, the calcination temperature may be a temperature at which a portion of the compounds mixed as described above is decomposed and melted, and for example, the calcination temperature is preferably 250° C. to 2000° C., and more preferably 350° C. to 1500° C. Furthermore, on the occasion of calcination, it is preferable to perform preliminary calcination at 250° C. to 900° C. In the calcination method described above, the calcination time is preferably 1 hour to 72 hours, and more preferably 2 hours to 20 hours. Also, the method of mixing the raw materials may be a dry method or a wet method. Also, annealing may be carried out at 200° C. to 900° C. after calcination.

Furthermore, materials in which a substance having a composition that is different from the main substance constituting the positive electrode active substance is attached on the surface of each of these positive electrode active substances, can also be used.

Examples of the surface-adhering substance include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; and carbonates such as lithium carbonate, calcium carbonate, and magnesium carbonate.

These surface-adhering substances can be attached to the surface of a positive electrode active substance, for example, by a method of adding by impregnation a surface-adhering substance to the positive electrode active substance by dissolving or suspending the surface-adhering substance in a solvent, and drying the solution or suspension; a method of adding by impregnation a surface-adhering substance precursor to the positive electrode active substance by dissolving or suspending the surface-adhering substance precursor in a solvent, and then allowing the surface-adhering substance precursor to react through heating or the like; a method of adding a surface-adhering substance to a positive electrode active substance precursor, and simultaneously calcining the mixture; or the like.

In the calcination method described above, the calcining gas atmosphere is not particularly limited, and an oxidizing atmosphere and a reducing atmosphere can all be used. Examples thereof include air, a gas prepared by adjusting the oxygen concentration at an arbitrary ratio, hydrogen, carbon monoxide, nitrogen, argon, helium, krypton, xenon, and carbon dioxide.

The average particle size of the positive electrode active substance used in the non-aqueous electrolyte secondary battery of the invention is not particularly limited, but the average particle size is preferably 0.1 μm to 50 μam. The specific surface area is not particularly limited, but specific surface area as measured by the BET method is preferably 0.01 $m^2/g$ to 50 $m^2/g$. Furthermore, the pH of the supernatant obtainable when 5 g of the positive electrode active substance is dissolved in 100 ml of distilled water is preferably from 7 to 12.

In order to adjust the positive electrode active substance to a predetermined particle size, a well-known pulverizer or classifier may be used. For example, a mortar, a ball mill, a vibrating ball mill, a vibrating mill, a satellite ball mill, a planetary ball mill, a swirling air flow jet mill, or a sieve is used. The positive electrode active substance obtained according to the calcination method may be used after washing the substance with water, an acidic aqueous solution, an alkaline aqueous solution, or an organic solvent.

(b-2) Negative Electrode Active Substance

There are no particular limitations on the negative electrode active substance used in the non-aqueous electrolyte liquid for a secondary battery of the invention, as long as the negative electrode active substance is capable of reversible insertion and release of lithium ions, and examples thereof include carbonaceous materials, metal oxides such as tin oxide and silicon oxide, metal composite oxides, simple lithium substance or lithium alloys such as a lithium-aluminum alloy, and metals capable of forming an alloy with lithium, such as Sn and Si.

For these materials, one kind may be used alone, or two or more kinds may be used in any combination at any proportions. Among them, carbonaceous materials or lithium composite oxides are preferably used from the viewpoint of safety.

Furthermore, the metal composite oxides are not particularly limited as long as the materials are capable of adsorption and release of lithium, but it is preferable for the composite oxides to contain titanium and/or lithium as constituent components, from the viewpoint of high current density charging-discharging characteristics.

A carbonaceous material that is used as a negative electrode active substance is a material which is substantially composed of carbon. Examples thereof include petroleum pitch, natural graphite, artificial graphite such as vapor-grown graphite, and carbonaceous materials obtained by firing various synthetic resins such as PAN-based resins and furfuryl alcohol resins. Further examples include various carbon fibers such as PAN-based carbon fibers, cellulose-based carbon fibers, pitch-based carbon fibers, vapor-grown carbon fibers, dehydrated PVA-based carbon fibers, lignin carbon fibers, vitreous carbon fibers, and activated carbon fibers; mesophase microspheres, graphite whiskers, and tabular graphite.

These carbonaceous materials may be classified into hardly graphitized carbon materials and graphite-based carbon materials, according to the degree of graphitization. Also, it is preferable that the carbonaceous materials have the plane spacing, density, and size of crystallites described in JP 62-22066 A, JP 2-6856 A, and JP 3-45473 A. The carbonaceous materials are not necessarily single materials, and a mixture of natural graphite and an artificial graphite as described in JP 5-90844 A, a graphite having a coating layer as described in JP 6-4516 A, and the like can also be used.

In regard to the metal oxides and metal composite oxides that are negative electrode active substances used in the lithium secondary battery of the invention, at least one of these may be included. The metal oxides and metal composite oxides are particularly preferably amorphous oxides, and furthermore, chalcogenides which are reaction products of metal elements and the elements of Group 16 of the Periodic Table of Elements are also preferably used.

The term amorphous as used herein means that the substance has a broad scattering band having an apex at a 2θ value in the range of 20° to 40°, as measured by an X-ray diffraction method using CuKα radiation, and the substance may also have crystalline diffraction lines. The highest intensity obtainable among the crystalline diffraction lines exhibited at a 2θ value in the range of from 40° to 70° is preferably 100 times or less, and more preferably 5 times or less, the diffraction line intensity of the apex of the broad scattering band exhibited at a 2θ value in the range of from 20° to 40°, and it is particularly preferable that the substance does not have any crystalline diffraction line.

Among the group of compounds consisting of the amorphous oxides and chalcogenides, amorphous oxides and chalcogenides of semi-metallic elements are more preferred, and oxides and chalcogenides formed from one kind only or combinations of two or more kinds of the elements of Group 13 (IIIB) to Group 15 (VB) of the Periodic Table of Elements, Al, Ga, Si, Sn, Ge, Pb, Sb and Bi are particularly preferred.

Specific preferred examples of the amorphous oxides and chalcogenides include, for example, $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. Furthermore, these may also be composite oxides with lithium oxide, for example, $Li_2SnO_2$.

Among the group of compounds consisting of the preferred amorphous oxides and chalcogenides that can be used as the negative electrode active substance used in the lithium secondary battery of the invention, amorphous oxides represented by Sn, Si, and Ge are even more preferred, and an amorphous oxide represented by the following formula (12) is particularly preferred:

$$SnM^1{}_dM^2{}_eO_f \qquad \text{Formula (12)}$$

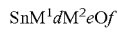

In formula (12), $M^1$ represents at least one or more kinds of elements selected from Al, B, P, and Ge. $M^2$ represents at least one or more kinds of elements selected from the elements of Group 1 (Ia), the elements of Group 2 (IIa), the elements of Group 3 (Ma) of the Periodic Table of Elements, and halogen elements. d represents a number of from 0.2 to 2, e represents a number of from 0.01 to 1, and d and e are in the relationship of 0.2<d+e<2. f represents a number of from 1 to 6.

As a synthesis method for a compound selected from the group consisting of amorphous oxides and chalcogenides that are suitable as the negative electrode active substance according to the invention, any of a calcination method and a solution method can be employed, but a calcination method is more preferred.

When the negative electrode active substance is synthesized by a calcination method, it is preferable to thoroughly mix the oxides, chalcogenides or compounds of the respective corresponding elements, and then calcine the mixture to obtain amorphous oxides and chalcogenides.

The calcination temperature in the calcination method is preferably from 500° C. to 1500° C., and the calcination time is preferably from 1 hour to 100 hours.

In the calcination method described above, temperature decrease after calcination may be achieved such that the product may be cooled in the calcining furnace, or the product may be taken out from the calcining furnace and then cooled by, for example, introducing the product into water. Also, an ultra-rapid cooling method selected from a gun method, a hammer-anvil method, a slap method, a gas atomization method, a plasma spray method, a centrifugal rapid cooling method, a melt drag method, and the like described in Ceramic Processing (Gihodo Shuppan, 1987), p. 217 can be used. Furthermore, cooling may also be achieved by using a single roller method or a twin roller method described in New Glass Handbook (Maruzen Co., Ltd., 1991), p. 172. In the case of a material that melts during calcination, the calcination product may be continuously removed while raw materials are supplied during calcination. In the case of a material that melts during calcination, it is preferable to stir the molten liquid.

The calcining gas atmosphere in the calcination method is preferably an atmosphere having an oxygen content of 5% by volume or less, and an inert gas atmosphere is more preferred. Suitable examples of the inert gas include nitrogen, argon, helium, krypton, and xenon. Among them, pure argon is particularly preferred.

The average particle size of the negative electrode active substance used in the non-aqueous electrolyte secondary battery of the invention is preferably 0.1 μm to 60 μm. In order to adjust the negative electrode active substance to a predetermined particle size, a well-known pulverizer or classifier may be used. For example, pulverizers such as a mortar, a ball mill, a sand mill, a vibrating ball mill, a satellite ball mill, and a planetary ball mill; pulverizes having a classification function, such as a swirling air flow jet mill; and a sieve as a classifier are suitably used. At the time of pulverization, wet pulverization of using water or an organic solvent such as methanol to co-exist with the negative electrode active substance can also be carried out as necessary. In order to obtain a desired particle size, it is preferable to perform classification. There are no particular limitations on the classification method, and a sieve, an air classifier or the like can be used as necessary. Classification may be carried out by using a dry method as well as a wet method.

The chemical formula of the compound obtained by the calcination method can be obtained by using an inductively coupled plasma (ICP) emission spectroscopic method as a measurement method, and computed from the mass difference of the powder measured before and after calcination, by a convenient method.

According to the invention, suitable examples of the negative electrode active substance that can be used together with the amorphous oxide negative electrode active substances represented by Sn, Si and Ge, include carbon materials that are capable of adsorption and release of lithium ions or lithium metal, as well as lithium, lithium alloys, and metal capable of alloying with lithium.

(b-3) Electroconductive Material

As for the electroconductive material, any material may be used as long as it is an electron conductive material which does not cause a chemical change in a constructed secondary battery, and any known electroconductive material can be used. Usually, electroconductive materials such as natural graphite (scale-like graphite, flaky graphite, earthly graphite, and the like), artificial graphite, carbon black, acetylene black, Ketjen black, carbon fibers, metal powders (copper, nickel, aluminum, silver (described in JP 63-10148, 554 A), and the like), metal fibers, and polyphenylene derivatives (described in JP 59-20,971 A) can be incorporated singly or as mixtures thereof. Among them, a combination of graphite and acetylene black is particularly preferred.

The amount of addition of the electroconductive agent is preferably 1% to 50% by mass, and more preferably 2% to 30% by mass. In the case of carbon or graphite, the amount of addition is particularly preferably 2% to 15% by mass.

(b-4) Binder

In the invention, a binder for retaining the electrode mixture described above is used.

Preferred examples of the binder include polysaccharides, thermoplastic resins, and polymers having rubber elasticity, and among them, preferred examples include emulsions (latexes) or suspensions of starch, carboxymethyl cellulose, cellulose, diacetyl cellulose, methyl cellulose, hydroxyethyl cellulose, hydroxypropyl cellulose, sodium alginate; water-soluble polymers such as polyacrylic acid, poly(sodium acrylate), polyvinylphenol, polyvinyl methyl ether, polyvinyl alcohol, polyvinylpyrrolidone, polyacrylonitrile, polyacrylamide, polyhydroxy(meth)acrylate, and a styrene-maleic acid copolymer; polyvinyl chloride, polytetrafluoroethylene, polyvinylidene fluoride, a tetrafluoroethylene-hexafluoropropylene copolymer, a vinylidene fluoride-tetrafluoroethylene-hexafluoropropylene copolymer, polyethylene, polypropylene, an ethylene-propylene-diene terpolymer (EPDM), a sulfonated EPDM, a polyvinyl acetal resin, (meth)acrylic acid ester copolymers containing (meth)acrylic acid esters such as methyl methacrylate and 2-ethylhexyl acrylate, a (meth)acrylic acid ester-acrylonitrile copolymer, a polyvinyl ester copolymer containing a vinyl ester such as vinyl acetate, a styrene-butadiene copolymer, an acrylonitrile-butadiene copolymer, polybutadiene, a neoprene rubber, a fluorine rubber, polyethylene oxide, a polyester polyurethane resin, a polyether polyurethane resin, a polycarbonate polyurethane resin, a polyester resin, a phenolic resin, and an epoxy resin. More preferred examples include a polyacrylic acid ester-based latex, carboxymethyl cellulose, polytetrafluoroethylene, and polyvinylidene fluoride.

As for the binder, one kind may be used alone, or two or more kinds may be used as mixtures.

If the amount of addition of the binder is small, the retention power and the aggregating power of the electrode mixture are weakened. If the amount of addition is too large, the electrode volume increases, and the capacity per unit volume or unit mass of the electrode is decreased. For such reasons, the amount of addition of the binder is preferably 1% to 30% by mass, and more preferably 2% to 10% by mass.

(b-5) Filler

The electrolyte liquid of the invention may include a filler. Regarding the material that forms the filler, any fibrous material that does not cause a chemical change in the secondary battery of the invention can be used. Usually, fibrous fillers formed from olefinic polymers such as polypropylene and polyethylene, and materials such as glass and carbon are used.

The amount of addition of the filler is not particularly limited, but the amount of addition is preferably 0% to 30% by mass.

(b-6) Current Collector

As the current collector for the positive and negative electrodes, an electron conductor that does not cause a chemical change in the non-aqueous electrolyte secondary battery of the invention is used. Preferred examples of the current collector for the positive electrode include aluminum, stainless steel, nickel, and titanium, as well as aluminum or stainless steel treated with carbon, nickel, titanium, or silver on the surface. Among them, aluminum and aluminum alloys are more preferred.

Preferred examples of the current collector for the negative electrode include copper, stainless steel, nickel, and titanium, and more preferred examples include copper and copper alloys.

Regarding the shape of the current collector, a film sheet-shaped current collector is usually used, but a net-shaped material, a film sheet having openings formed by punching, a lath material, a porous material, a foam, a fiber sheet material obtained by molding a group of fibers, and the like can also be used. The thickness of the current collector is not particularly limited, but the thickness is preferably 1 µm to 500 µm. Furthermore, it is also preferable to provide surface unevenness on the surface of the current collector through a surface treatment.

Electrode mixtures for lithium secondary batteries are formed by members appropriately selected from these materials.

(c) Separator

The separator used in the lithium secondary battery of the invention is not particularly limited as long as the separator is formed of a material which electronically insulates the positive electrode and the negative electrode, and has mechanical strength, ion permeability, and oxidation-reduction resistance at the surfaces in contact with the positive electrode and the negative electrode.

Examples of such a material that may be used include porous polymer materials or inorganic materials, organic-inorganic hybrid materials, and glass fibers. These separators preferably have a shutdown function for securing safety, that is, a function of increasing resistance by blocking the voids at 80° C., and thereby cutting off the electric current, and the blocking temperature is preferably from 90° C. to 180° C.

The shape of the pores of the separator is usually circular or elliptical, and the size is 0.05 µm to 30 µm, and preferably 0.1 µm to 20 µm. Furthermore, as in the case of producing the material by an extension method or a phase separation method, a material having rod-shaped or irregularly shaped pores may also be used. The proportion occupied by these pores, that is, the pore ratio, is 20% to 90%, and preferably 35% to 80%.

Regarding the polymer materials described above, a single material such as polyethylene or polypropylene may be used, or a compositized material of two or more kinds may also be used. A laminate of two or more kinds of finely porous films that are different in the pore size, pore ratio, pore blocking temperature and the like, is preferred.

As the inorganic substance, oxides such as alumina and silicon dioxide, nitrides such as aluminum nitride and silicon nitride, and sulfates such as barium sulfate and calcium sulfate are used, and a particle-shaped or fiber-shaped material is used. Regarding the form, a thin film-shaped material such as a non-woven fabric, a woven fabric, or a finely porous film is used. In the case of a thin film-shaped material, a material having a pore size of 0.01 µm to 1 µm and a thickness of 5 µm to 50 µm is suitably used. In addition to the independent thin film-shaped materials described above, a separator obtained by forming a composite porous layer containing particles of the inorganic substance described above, as a surface layer of the positive electrode and/or the negative electrode by using a binder made of a resin, can be employed. For example, a separator in which alumina particles having a 90% particle size of less than 1 µm are formed on both surfaces of the positive electrode as porous layers by using a binder of a fluororesin, may be used.

(4) Production of Non-Aqueous Electrolyte Secondary Battery

Here, a method for producing the non-aqueous electrolyte lithium secondary battery of the invention will be described.

As the shape of the lithium secondary battery of the invention, any form such as a sheet form, a rectangular form, or a cylindrical form can be applied as described above. The mixture of a positive electrode active substance or the negative electrode active substance is mainly used after being applied (coated) on a current collector, dried, and compressed.

Hereinafter, a bottomed cylindrical-shaped lithium secondary battery 10 will be taken as an example, and its configuration and a production method thereof will be described with reference to FIG. 1. FIG. 1 is a schematic cross-sectional diagram illustrating an example of the bottomed cylindrical lithium secondary battery 10 in which a positive electrode sheet 14 and a negative electrode sheet 16 that are superimposed with a separator 12 interposed therebetween, are wound and accommodated in a packaging can 18.

First, a negative electrode active substance is mixed with a solution prepared by dissolving a binder, a filler and the like that are used as desired in an organic solvent, and thus a negative electrode mixture is prepared in a slurry form or in a paste form. The negative electrode mixture thus obtained is uniformly applied over the entire surface of both sides of a metal core as a current collector, and then the organic solvent is removed to form a negative electrode mixture layer. Furthermore, the laminate of the current collector and the negative electrode mixture layer is rolled by using a roll pressing machine or the like to produce a laminate having a predetermined thickness, and thereby, a negative electrode sheet (electrode sheet) 16 is obtained.

Suitable examples of the method for applying the negative electrode mixture include a reverse roll method, a direct roll method, a blade method, a knife method, an extrusion method, a curtain method, a gravure method, a bar method, a dipping method, and a squeezing method. Among them, the method for applying the negative electrode mixture is preferably a blade method, a knife method or an extrusion method.

Furthermore, it is preferable that the application is carried out at a speed of 0.1 m/min to 100 m/min. At this time, a satisfactory surface state of the coating layer may be obtained by selecting the coating method in accordance with the solution properties and dryability of the mixture. Coating may be carried out sequentially on one side by one side, or may be carried out simultaneously on both sides.

Furthermore, in the coating process, the negative electrode mixture may be applied so as to form a continuous layer, may be applied intermittently (discontinuously in the direction of application), or may be carried out in a stripe form that extends in parallel to the direction of application. The thickness, length and width of the negative electrode mixture coating layer can be determined in accordance with the shape or size of the battery, but it is preferable to set the thickness of the coating layer on one surface to 1 μm to 2,000 μm while being in a compressed state after drying.

Examples of a method for drying and dehydrating a negative electrode mixture coating product for obtaining an electrode sheet that is obtainable by rolling a laminate of the current collector and the negative electrode mixture layer, include methods of employing hot air, vacuum, infrared radiation, far-infrared radiation, electron beams, and low humidity air singly or in combination. The drying temperature is preferably 80° C. to 350° C., and more preferably 100° C. to 250° C.

The water content is preferably adjusted to 2000 ppm or less relative to the total amount of the battery, and the water content in the positive electrode mixture, the negative electrode mixture, and the electrolyte is preferably adjusted to 500 ppm or less, respectively.

Regarding the method for pressing the sheet at the time of rolling a laminate of the current collector and the negative electrode mixture layer, any generally employed method can be used, but particularly a calender pressing method is preferred. There are no particular limitations, but the press pressure is preferably 0.2 t/cm$^2$ to 3 t/cm$^2$.

The press speed of the calender pressing method is preferably 0.1 m/min to 50 m/min, and the press temperature is preferably room temperature (25° C.) to 200° C.

Next, a positive electrode active substance is mixed with a solution obtained by dissolving a carbon-based electroconductive agent, a binder and the like that are used as desired, in an organic solvent or the like, and thus a positive electrode mixture is prepared in a slurry form or in a paste form. The positive electrode mixture thus obtained is uniformly applied over the entire surface of both sides of a metal core as a current collector, and then the organic solvent is removed to form a positive electrode mixture layer on the surface of the current collector. Furthermore, the laminate of the current collector and the positive electrode mixture layer is rolled by using a roll pressing machine or the like to produce a laminate having a predetermined thickness, and thereby, a positive electrode sheet 14 is obtained.

In regard to the coating method for the positive electrode mixture at the time of producing the positive electrode sheet 16, the drying method for the positive electrode mixture layer formed by coating, and the like, the same conditions as those employed at the time of forming the negative electrode sheet 14 may be selected.

The positive electrode sheet 16 and the negative electrode sheet 14 thus obtained are laminated with a separator 12 interposed therebetween, and this is wound into a cylindrical shape. Thereby, a helical electrode body is obtained.

When a helical electrode body is formed, the ratio of width of the negative electrode sheet 14 relative to the positive electrode sheet 16 is such that when the width of the positive electrode sheet 16 is designated as 1, the width of the negative electrode sheet 14 is preferably 0.9 to 1.1, and particularly preferably 0.95 to 1.0. The content ratio of the positive electrode active substance and the negative electrode active substance in the helical electrode body varies with the type of the compound or the formulation of the mixture.

Insulating sheets 20 are respectively disposed at the top and the bottom of the helical electrode body thus obtained, and then this electrode body is inserted into a packaging can 18 through the opening of the packaging can 18 which has been molded from a single sheet of plate into a cylindrical shape by pressing work and also functions as a negative electrode terminal. Thereafter, a negative electrode current collecting tab (not depicted in the diagram) that extends from the negative electrode sheet 14 of the electrode body is welded to the bottom inside the packaging can 18 to form an electrical connection. At the same time, a positive electrode current collecting tab 24 extending from the positive electrode sheet 16 of the electrode body is welded to the bottom of the bottom plate of an opening sealing plate 22 to be electrically connected.

Thereafter, the electrolyte liquid of the invention is injected into the packaging can 18, the opening sealing plate 22 is covered, and the opening of the packaging can 18 is sealed by using a gasket 26. Thus, a bottomed cylindrical-shaped lithium secondary battery 10 is formed. In the present exemplary embodiment, the opening sealing plate 22 may include a pressure-sensitive valve body 28 as a safety valve, and a current blocking element 30 as an overcurrent preventing element.

In the present exemplary embodiment, a cylindrical battery has been explained as an example, but the shape of the lithium secondary battery of the invention is not limited to this. For example, positive and negative electrode sheets produced by the methods described above are superimposed with a separator interposed therebetween, and then the assembly may be processed directly into a sheet-like battery. Alternatively, a rectangular-shaped battery may be formed by folding the assembly, inserting the assembly into a rectangular can, electrically connecting the can with the sheet, subsequently injecting an electrolyte, and sealing the opening by using an opening sealing plate.

In all of the exemplary embodiments, a safety valve can be used as an opening sealing plate for sealing the opening, similarly to the present exemplary embodiment. Furthermore, an opening sealing member that is represented by a seal plate may be equipped with various safety elements that are conventionally known, in addition to the safety valve. For example, as overcurrent preventing elements, a fuse, a bimetal, a PTC element and the like are suitably used as safety elements that are mounted on the opening sealing member.

Furthermore, as a countermeasure for an increase in the internal pressure of the battery can, a method of inserting a slit in the battery can, a gasket cracking method, an opening sealing plate cracking method, or a method of disconnecting from a lead plate can be used in addition to the method of providing a safety valve. Furthermore, in the lithium secondary battery, a protective circuit incorporated with an overcharge-coping member or an overdischarge-coping member may be provided to a charging machine, or the aforementioned protective circuit may be provided independently of the lithium secondary battery, and the two may be connected to each other.

For the production of a can or a lead plate, a metal or an alloy having electrical conductibility can be used. As a material for the can or lead plate, for example, metals such as iron, nickel, titanium, chromium, molybdenum, copper, and aluminum, or alloys thereof are suitably used.

For the welding method that may be used when a cap, a can, a sheet, and a lead plate are welded, any known methods (for example, an electric welding method using a direct current or an alternating current, a laser welding method, an ultrasonic welding method, and the like) can be used. As the sealing agent for sealing an opening which is used to seal the opening of the lithium secondary battery, any conventionally known compounds such as asphalt, and mixtures can be used.

[3] Use of Lithium Secondary Battery of Present Invention

There are no particular limitations on the application embodiment for the lithium secondary battery of the invention, but in the case of mounting the lithium secondary battery in electronic equipment, examples of the equipment include notebook computers, pen-input computers, mobile computers, electronic book players, mobile telephones, cordless phone handsets, pagers, handy terminals, portable facsimiles, portable copying machines, portable printers, headphone stereo sets, video movie cameras, liquid crystal television sets, handy cleaners, portable CDs, mini disc players, electric shavers, transceivers, electronic organizers, calculators, memory cards, portable tape recorders, radios, backup power supplies, and memory cards. Other additional applications for consumer use include automobiles, electromotive vehicles, motors, lighting devices, toys, game players, load conditioners, timepieces, strobes, cameras, and medical devices (pacemakers, hearing aids, shoulder massaging machines, and the like). Furthermore, the lithium secondary battery can be used as various batteries for munition and space batteries. Also, the lithium secondary battery of the invention can be combined with a solar cell.

EXAMPLES

Hereinafter, Examples of the invention will be described, but the invention is not intended to be limited by these Examples.

Examples 1 to 11 and Comparative Examples 1 to 3

Preparation of Non-Aqueous Electrolyte Liquid for a Secondary Battery

1. Synthesis of Particular Silicon Compound

Synthesis Example 1

Synthesis of Particular Silicon Compound (Si-1)

50 g of tetraethoxysilane, 25 g of ethyl glycolate, and 1.3 g of sodium ethoxide were mixed, and the mixture was heated to reflux at 150° C. for one hour. After the reaction, the temperature was maintained at 150° C., and while the degree of vacuum was slowly decreased from normal pressure to 100 mmHg, volatile components were distilled off. A distillate fraction obtainable at 15 mmHg was collected, and thus 15 g of a particular silicon compound (Si-1) in the form of a colorless liquid was obtained.

Synthesis Example 2

Synthesis of Particular Silicon Compound (Si-2)

42.8 g of methyltriethoxysilane, 25 g of ethyl glycolate, and 1.63 g of sodium ethoxide were mixed, and the mixture was heated to reflux at 150° C. for one hour. After the reaction, the temperature was maintained at 150° C., and while the degree of vacuum was slowly decreased from normal pressure to 100 mmHg, volatile components were distilled off. A distillate fraction obtainable at 30 mmHg was collected, and thus 10 g of a particular silicon compound (Si-2) in the form of a colorless liquid was obtained.

Synthesis Example 3

Synthesis of Particular Silicon Compound (Si-3)

50 g of tetraethoxysilane and 25 g of ethylene glycol monoacetate were mixed, and the mixture was heated to reflux at 150° C. for 2 hours. Subsequently, the temperature was maintained at 150° C., and while the degree of vacuum was slowly decreased from normal pressure to 100 mmHg, volatile components were distilled off A distillate fraction obtainable at 15 mmHg was collected, and thus 8 g of a particular silicon compound (Si-3) in the form of a colorless liquid was obtained.

Synthesis Example 4

Synthesis of Silicon Compound (Si-6)

A silicon compound (Si-6) was obtained by the same method as that used in Synthesis Example 2, except that an equimolar amount of tetraethoxy-1,2-dimethylsiloxane was used instead of methyltriethoxysilane, which was a raw material used in Synthesis Example 2.

2. Preparation of Electrolyte Liquid

Preparation Example 2

N-lithiotrifluoromethane sulfonimide (LiTFSI) was dissolved in the particular silicon compound (Si-1) that was obtained in Synthesis Example 1 and was in the form of a colorless liquid, to a concentration of 1 M, and thus an electrolyte liquid E-1 of Example 1 was prepared.

Next, electrolyte liquids E-2 to E-5 (electrolyte liquids of Example 2 to Example 5) were prepared in the same manner by using the particular silicon compounds (Si-2), (Si-3), (Si-6) and (Si-20), respectively.

3. Preparation of Electrolyte Liquid Containing Additive

Preparation Example 3-1

Preparation of Electrolyte Liquid E-6

An electrolyte liquid E-6 of Example 6 was prepared by adding trimethyl phosphate to the electrolyte liquid E-1 obtained in the (Preparation Example 2) in an amount of 20% by weight of the electrolyte liquid.

Preparation Example 3-2

Preparation of Electrolyte Liquid E-7

An electrolyte liquid E-7 of Example 7 was prepared by adding tris(2,2,2-trifluoroethyl) phosphate (A1) to the electrolyte liquid E-1 obtained in the (Preparation Example 2) in an amount of 20% by weight of the electrolyte liquid.

Preparation Example 3-3

Preparation of Electrolyte Liquid E-8

An electrolyte liquid E-8 of Example 8 was prepared by adding a phosphazene compound (A2) to the electrolyte liquid E-1 obtained in the (Preparation Example 2) in an amount of 20% by weight of the electrolyte liquid.

Preparation Example 3-4

Preparation of Electrolyte Liquid E-9

An electrolyte liquid E-9 of Example 9 was prepared by adding a phosphazene compound (A3) to the electrolyte liquid E-1 obtained in the (Preparation Example 2) in an amount of 20% by weight of the electrolyte liquid.

Preparation Example 3-5

Preparation of Electrolyte Liquid E-10

An electrolyte liquid E-10 of Example 10 was prepared by adding a phosphonic acid ester compound (A4) to the electrolyte liquid E-1 obtained in the (Preparation Example 2) in an amount of 20% by weight of the electrolyte liquid.

Preparation Example 3-6

Preparation of Electrolyte Liquid E-11

An electrolyte liquid E-11 of Example 11 was prepared by adding a phosphite compound (A5) to the electrolyte liquid E-1 obtained in the (Preparation Example 2) in an amount of 20% by weight of the electrolyte liquid.

As Comparative Examples, an electrolyte liquid RE-1 of Comparative Example 1 and an electrolyte liquid RE-2 of Comparative Example 2 were respectively prepared in the same manner as in Example 1, except that an equimolar amount of diethyl malonate (R-1) described in JP 8-190932 A and an equimolar amount of the silane compound (R-2) described in JP 2005-154697 A were used instead of the particular silicon compound (Si-1).

Furthermore, an electrolyte liquid RE-3 of Comparative Example 3 was prepared by using a solvent prepared by adding 1 part by mass of diallyl succinate (R-3) described in JP 2006-294414 A to propylene carbonate (PC).

The structures of the comparative compounds (R-1), (R-2) and (R-3) used in the Comparative Examples are as follows.

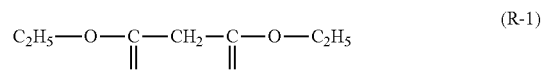

[Evaluation of Characteristics of Electrolyte Liquids]

The ionic conductivity, transport number, and voltage resistance of the electrolyte liquids of Examples 1 to 11 and Comparative Examples 1 to 3 were evaluated.

(Measurement of Ionic Conductivity)

The ionic conductivity was determined by an alternating current impedance method at 30° C. by using a cell produced by disposing a Teflon (registered trademark) spacer (perforations with a diameter of 6 mmΦ) having a thickness of 250 μm between two sheets of stainless steel plates.

(Measurement of Transport Number)

The transport number was determined by the method described in a reference document (James Evans, Colin A. Vincent, Peter G. Bruce, Polymer, Volume 28, Issue 13, December 1987, Pages 2324-2328).

(Flame Retardancy Test)

An evaluation on the flame retardancy of the electrolyte liquids was carried out by a method based on the UL94HB method of the UL (Underwriting Laboratories) standards, which are polymer flame retardancy testing standards.

Specifically, a non-flammable glass fiber filter paper was cut to a size of 13 mm×125 mm, and the filter paper was soaked with 1.5 mL of an electrolyte liquid to be evaluated. Thus, a test sample (test specimen) was prepared. Marking lines were drawn at the positions of 25 mm and 100 mm from an edge, and the filter paper was ignited with a gas burner having a test flame height of 20 mm, from the edge on the side of the 25-mm marking line. The combustion state was visually observed, and thereby flame retardancy was evaluated according to the following criteria.

(Evaluation Criteria)

AA: In case where combustion stopped without reaching the 25-mm marking line

A: In case where the test flame stopped between 25 mm and 100 mm, or in case where the combustion time between 25 mm and 100 mm was 50 seconds or longer B: In case where the combustion time between 25 mm and 100 mm was longer than or equal to 30 seconds and shorter than 50 seconds C: In case where the combustion time between 25 mm and 100 mm was shorter than 30 seconds The results for the measurement of ionic conductivity and transport number, the "transport number×ionic conductivity", which is an index of Li ion conductibility, and the results for the evaluation of flame retardancy are presented in the following Table 1.

(Evaluation of Voltage Resistance)

Voltage resistance was evaluated by a cyclic voltammetric method by using a tripolar electrochemical cell which used Pt in the operating electrode and lithium metal in the counter electrode and the reference electrode.

Sweeping was carried out three times at a sweeping rate of 1 mV/sec over the potential range of from 2 V to 5 V with respect to lithium, and the oxidation current value at 4.3 V in the third voltammogram was designated as the index for voltage resistance. The results are presented in Table 1.

Also, it was found that in the electrolyte liquids E-6 to E-11 of the invention, flame retardancy was further enhanced by using phosphorus compounds.

Examples 12 to 16 and Comparative Example 4

Lithium Secondary Battery

Lithium secondary batteries for evaluation which used the electrolyte liquids indicated in the following Table 2 were produced by using a lithium cobaltate mixture sheet (electrode capacity: 1.5 mAh/cm$^2$; aluminum foil base, 16 mmΦ) for the positive electrode, a natural spherical graphite electrode sheet (electrode capacity: 1.6 mAh/cm2; Cu foil base, 16 mmΦ) for the negative electrode, and a porous film made of polypropylene (thickness: 25 μm, 24 mmΦ) for the separator.

TABLE 1

| | Electrolyte liquid | Ionic conductivity | Lithium ion transport number (mS/cm) | Lithium ion conductibility = ionic conductivity × transport number | Current value at 4.3 V (mA) | Flame retardancy |
|---|---|---|---|---|---|---|
| Example 1 | E-1 (Invention) | 2.6 | 0.42 | 1.09 | 0.03 | B |
| Example 2 | E-2 (Invention) | 2.8 | 0.44 | 1.23 | 0.02 | B |
| Example 3 | E-3 (Invention) | 3.2 | 0.28 | 0.90 | 0.05 | B |
| Example 4 | E-4 (Invention) | 2.7 | 0.52 | 1.40 | 0.01 | B |
| Example 5 | E-5 (Invention) | 2.2 | 0.34 | 0.75 | 0.1 | B |
| Example 6 | E-6 (Invention) | 3.5 | 0.32 | 1.12 | 0.06 | A |
| Example 7 | E-7 (Invention) | 3.6 | 0.33 | 1.19 | 0.05 | A |
| Example 8 | E-8 (Invention) | 3.2 | 0.31 | 0.99 | 0.04 | A |
| Example 9 | E-9 (Invention) | 3.1 | 0.33 | 1.02 | 0.09 | A |
| Example 10 | E-10 (Invention) | 3.3 | 0.32 | 1.06 | 0.09 | A |
| Example 11 | E-11 (Invention) | 3.5 | 0.33 | 1.16 | 0.07 | A |
| Comparative Example 1 | RE-1 (Comparative Example) | 1.8 | 0.28 | 0.50 | 0.2 | B |
| Comparative Example 2 | RE-2 (Comparative Example) | 0.9 | 0.15 | 0.14 | 0.41 | B |
| Comparative Example 3 | RE-3 (Comparative Example) | 5.9 | 0.2 | 1.18 | 0.64 | C |

As is obvious from Table 1, the electrolyte liquids E-1 to E-11 of Examples 1 to 11 have high lithium ion conductibility (ionic conductivity×transport number) as compared with the electrolyte liquid RE-1 of Comparative Example 1.

Furthermore, in a comparison between Examples 1 to 4 and Example 5, it was found that Examples 1 to 4 that used the silane compounds (Si-1), (Si-2), (Si-3) and (Si-6) in which the substituent represented by formula (3) does not contain a ring structure, exhibit higher lithium ion conductibility than Example 5 that used the silane compound (Si-20) containing a ring structure.

When these electrolyte liquids are compared with the electrolyte liquid RE-3 of Comparative Example 3 which contained a general-purpose solvent PC as a main solvent, the electrolyte liquids E-1 to E-11 exhibited almost equivalent lithium ion conductibility, and their flame retardancy was significantly satisfactory.

Furthermore, in the electrolyte liquids E-1 to E-11 of the invention, the oxidation current at 4.3 V, which is an index of oxidation resistance, was markedly lower as compared with the various Comparative Examples, and from this, it was made clear that the electrolyte liquids of the invention have a significant effect on an enhancement of voltage resistance.

(Evaluation of Discharging-Charging Efficiency)

The lithium secondary batteries were charged with a constant current at 3.02 mA until the battery voltage reached 4.2 V, and subsequently, at a constant voltage of 4.2 V, the batteries were charged until the current value reached 0.1 mA.

The lithium secondary battery cells were placed in a constant temperature chamber at 60° C., and discharging was carried out at 0.6 mA corresponding to 0.2 C, until the battery voltage dropped to 2.5 V.

The charging and discharging processes were repeated two times, and the discharge efficiency (amount of discharged electricity/amount of charged electricity×100%) of the second time was evaluated. The results are presented in Table 2.

TABLE 2

| | Battery | Electrolyte liquid | Charge-discharge efficiency (%) |
|---|---|---|---|
| Example 12 | Cell-1 (Invention) | E-1 (Invention) | 89 |
| Example 13 | Cell-2 (Invention) | E-5 (Invention) | 86 |
| Example 14 | Cell-3 (Invention) | E-6 (Invention) | 84 |
| Example 15 | Cell-4 (Invention) | E-7 (Invention) | 89 |
| Example 16 | Cell-5 (Invention) | E-8 (Invention) | 83 |

TABLE 2-continued

| | Battery | Electrolyte liquid | Charge-discharge efficiency (%) |
|---|---|---|---|
| Comparative Example 4 | Cell-6 (Comparative Example) | RE-1 (Comparative Example) | 75 |

As is obvious from Table 2, it was found that the Cell-1 to Cell-5 that used the electrolyte liquids of the invention having high lithium ion conductibility exhibited higher charge-discharge efficiency of the batteries as compared with the Cell-6 that used an electrolyte liquid of Comparative Examples, and the stability of the electrolyte liquids at the time of charging and discharging was improved.

Examples 17 and 18 and Comparative Example 5

Lithium Secondary Battery

Lithium secondary batteries for evaluation which used the electrolyte liquids indicated in the following Table 3 were produced by using a lithium cobaltate mixture sheet (electrode capacity: 1.5 mAh/cm²; aluminum foil base, 16 mmΦ) for the positive electrode, a natural spherical graphite electrode sheet (electrode capacity: 1.6 mAh/cm2; Cu foil base, 16 mmΦ) for the negative electrode, and a porous film made of PP (thickness: 25 μm, 24 mmΦ) for the separator.

(Evaluation of Discharge Capacity Retention Ratio)

The lithium secondary batteries thus obtained were placed in a constant temperature chamber at 50° C. The lithium secondary batteries were charged with a constant current at 0.6 mA corresponding to 0.2 C, until the battery voltage reached 4.2 V; subsequently, at a constant voltage of 4.2 V, the batteries were charged until the current value reached 0.12 mA, or charged for 2 hours; and then constant current discharging was carried out at 0.6 mA corresponding to 0.2 C, until the battery voltage reached 2.75 V. This procedure was defined as one cycle. The discharge capacities of the lithium secondary batteries after completion of one cycle were measured.

Thereafter, the same charging and discharging processes were repeated for 20 cycles, and then the discharge capacities after completion of 20 cycles were measured. Thus, the discharge capacity retention ratios after a lapse of 20 cycles were calculated by the following formula. The results are presented in the following Table 3.

Discharge capacity retention ratio (%)=[Discharge capacity after 20 cycles/discharge capacity per cycle]×100

Furthermore, the same evaluation was also carried out for the lithium secondary battery of Example 12. The results are presented together.

TABLE 3

| | Battery | Electrolyte liquid | Discharge capacity retention ratio (%) |
|---|---|---|---|
| Example 12 | Cell-1 (Invention) | E-1 (Invention) | 85 |
| Example 17 | Cell-7 (Invention) | E-2 (Invention) | 83 |
| Example 18 | Cell-8 (Invention) | E-12 (Invention) | 72 |
| Comparative Example 5 | Cell-9 (Comparative Example) | RE-2 (Comparative Example) | 53 |

From the results of Table 3, it can be seen that the batteries produced by using the electrolyte liquids of the invention (Examples 12, 17 and 18) have high discharge capacity retention ratios as compared with the lithium secondary battery (Comparative Example 5) using the electrolyte liquid (RE-2) described in the Comparative Example. This is speculated to be attributable to the fact that in the negative electrodes of the batteries of Examples 12, 17 and 18, a satisfactory SEI (Solid Electrolyte Interface) film is formed on the electrode surface by the action of the particular silicon compound contained in the electrolyte liquid of the invention, and thus decomposition of the electrolyte liquid is suppressed.

Meanwhile, from a comparison of Examples 12 and 18 with Example 19, results were obtained in which those lithium secondary batteries produced by using the electrolyte liquid E-1 and the electrolyte liquid E-2 among the electrolyte liquids of the invention, had superior discharge capacity retention ratios as compared with the battery produced by using the electrolyte liquid E-12. This is contemplated to be because, since the electrolyte liquid (E-12) used in Example 19 contains a carbonate-based compound, a decomposition reaction such as a decarboxylation reaction that is concerned to affect carbonate-based compounds, has proceeded, even though to a slight extent, under high temperature and high voltage. Therefore, it is speculated that the battery using the electrolyte liquid (E-1) or (E-2), which does not include a compound having a carbonate structure, exhibits more satisfactory performance in connection with the discharge capacity retention ratio.

The entire disclosures of Japanese Patent Application No. 2010-212520 and Japanese Patent Application No. 2011-086245 are incorporated herein by reference.

All publications, patent applications, and technical standards mentioned in this specification are herein incorporated by reference to the same extent as if each individual publication, patent application, or technical standard was specifically and individually indicated to be incorporated by reference.

What is claimed is:

1. A non-aqueous electrolyte liquid for a secondary battery, comprising:

a metal salt including an ion of a metal which belongs to Group 1 or Group 2 of the Periodic Table of Elements, and at least one selected from the group consisting of silicon compounds represented by the following formula (1) or formula (2):

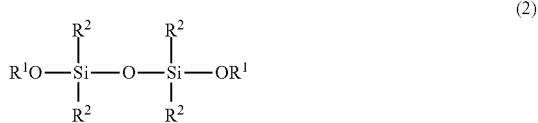

wherein, in formula (1) and formula (2), $R^1$ represents a substituent which includes an alkyl group having 1 to 5 carbon atoms and is bonded to an adjacent oxygen atom; $R^2$ represents an alkyl group having 1 to 5 carbon atoms, or an $OR^1$ group; $R^1$s and $R^2$s may be the same or different from each other, and at least one $R^1$ or $R^2$ represents a structure represented by the following formula (4) or formula (5); and $R^1$ and $R^2$ may be linked to each other and form a ring;

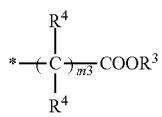

(4)

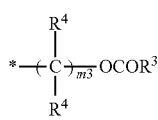

(5)

wherein, in formula (4) and formula (5), $R^4$s each independently represent a hydrogen atom, or a substituent having the same definition as $R^2$ in formula (1); $R^3$ represents an alkyl group having 1 to 5 carbon atoms; m3 represents an integer of from 1 to 5; * represents the position of bonding to the moiety —Si—O— of the silicon compound; and in a case where the substituent represented by formula (4) or formula (5) is carried by $R^2$, * represents the position of bonding to the moiety —Si— of the silicon compound.

2. The non-aqueous electrolyte liquid for a secondary battery according to claim 1, wherein the number of substituents represented by formula (4) or formula (5) in the silicon compounds represented by formula (1) and formula (2) is 1 or 2.

3. The non-aqueous electrolyte liquid for a secondary battery according to claim 1, wherein the metal salt including an ion of a metal which belongs to Group 1 or Group 2 of the Periodic Table of Elements is a lithium salt.

4. The non-aqueous electrolyte liquid for a secondary battery according to claim 1, wherein the content of the silicon compound represented by formula (1) or formula (2) in the electrolyte liquid is from 20% by mass to 80% by mass.

5. The non-aqueous electrolyte liquid for a secondary battery according to claim 1, further comprising a phosphorus compound.

6. The non-aqueous electrolyte liquid for a secondary battery according to claim 5, wherein the phosphorus compound is at least one compound selected from the group consisting of a phosphoric acid ester compound, a phosphazene compound, a phosphonic acid ester compound, and a phosphite compound.

7. The non-aqueous electrolyte liquid for a secondary battery according to claim 6, wherein the phosphoric acid ester compound is a compound represented by the following formula (p1):

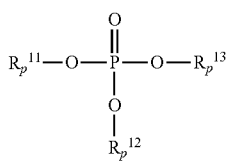

(p1)

wherein, in formula (p1), $R_p^{11}$, $R_p^{12}$, and $R_p^{13}$ each independently represent an alkyl group or an aryl group.

8. The non-aqueous electrolyte liquid for a secondary battery according to claim 6, wherein the phosphazene compound is a compound having a partial structure represented by the following formula (p2):

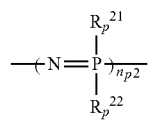

(p2)

wherein, in formula (p2), $R_p^{21}$ and $R_p^{22}$ each independently represent a halogen atom, an alkoxy group, or an aryloxy group; and $n_p^2$ represents an integer of 1 or greater.

9. The non-aqueous electrolyte liquid for a secondary battery according to claim 6, wherein the phosphonic acid ester compound is a compound represented by the following formula (p3):

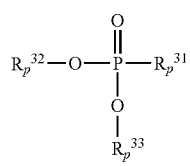

(p3)

wherein, in formula (p3), $R_p^{31}$, $R_p^{32}$, and $R_p^{33}$ each independently represent an alkyl group or an aryl group.

10. The non-aqueous electrolyte liquid for a secondary battery according to claim 6, wherein the phosphite compound is a compound represented by the following formula (p4):

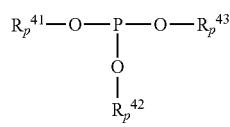

(p4)

wherein, in formula (p4), $R_p^{41}$, $R_p^{42}$, and $R_p^{43}$ each independently represent an alkyl group or an aryl group.

11. The non-aqueous electrolyte liquid for a secondary battery according to claim 5, wherein the content of the phosphorus compound in the electrolyte liquid is from 5% by mass to 40% by mass.

12. A lithium secondary battery comprising:
the non-aqueous electrolyte liquid for a secondary battery according to claim 1,
a positive electrode capable of insertion and release of lithium ions, and
a negative electrode capable of insertion and release, or dissolution and precipitation, of lithium ions.

* * * * *